US005737440A

United States Patent [19]
Kunkler

[11] Patent Number: 5,737,440
[45] Date of Patent: Apr. 7, 1998

[54] METHOD OF DETECTING A MARK ON A ORAPHIC ICON

[76] Inventor: Todd M. Kunkler, 11029 Sunburst St., Lakeview Terrace, Calif. 91342

[21] Appl. No.: 479,912

[22] Filed: Jun. 7, 1995

Related U.S. Application Data

[63] Continuation-in-part of Ser. No. 281,441, Jul. 27, 1994.
[51] Int. Cl.⁶ .............................. G06K 9/00; G06K 9/20; G06K 9/32; G06K 9/34
[52] U.S. Cl. .............. 382/137; 382/141; 382/175; 382/294; 382/317; 235/57; 235/58; 235/70; 235/94; 283/456; 356/186
[58] Field of Search ..................... 283/57, 58, 94, 283/70; 382/175, 317, 50, 137, 294; 356/186; 235/456

[56] References Cited

U.S. PATENT DOCUMENTS

| | | | |
|---|---|---|---|
| D. 197,421 | 1/1964 | Long | D59/6 |
| D. 231,563 | 4/1974 | Coy | D59/2 A |
| D. 279,907 | 7/1985 | Bateman | D19/11 |
| 3,980,323 | 9/1976 | Boyreau | 283/57 |
| 3,998,556 | 12/1976 | Wright | 356/186 |
| 4,027,142 | 5/1977 | Paup et al. | 235/379 |
| 4,308,588 | 12/1981 | Siwula | 364/705.02 |
| 4,384,272 | 5/1983 | Tanaka et al. | 382/50 |
| 4,455,100 | 6/1984 | Bauer | 400/88 |
| 4,513,992 | 4/1985 | May et al. | 283/94 |
| 4,588,211 | 5/1986 | Greene | 283/70 |
| 4,623,965 | 11/1986 | Wing | 705/33 |
| 4,634,148 | 1/1987 | Greene | 283/70 |
| 4,648,317 | 3/1987 | Bubley et al. | 101/123 |
| 4,667,985 | 5/1987 | Leonard et al. | 283/58 |
| 4,877,948 | 10/1989 | Krueger | 235/449 |
| 4,910,696 | 3/1990 | Grossman et al. | 364/705.02 |
| 5,021,952 | 6/1991 | Nishimura et al. | 705/30 |
| 5,039,847 | 8/1991 | Morii et al. | 235/379 |
| 5,060,980 | 10/1991 | Johnson et al. | 283/70 |
| 5,091,961 | 2/1992 | Baus, Jr. | 382/139 |
| 5,140,139 | 8/1992 | Shepard | 235/456 |
| 5,187,044 | 2/1993 | Prioleau et al. | 430/271.1 |
| 5,187,351 | 2/1993 | Clary | 235/379 |
| 5,221,838 | 6/1993 | Gutman et al. | 235/379 |
| 5,229,589 | 7/1993 | Schneider | 382/294 |
| 5,233,547 | 8/1993 | Kapp et al. | 364/705.02 |
| 5,237,620 | 8/1993 | Deaton et al. | 705/102 |
| 5,258,935 | 11/1993 | Ure et al. | 264/705.2 |
| 5,262,629 | 11/1993 | Hayashi et al. | 235/486 |
| 5,433,483 | 7/1995 | Yu | 283/58 |

FOREIGN PATENT DOCUMENTS

| | | |
|---|---|---|
| 0527639A2 | 2/1993 | European Pat. Off. . |
| 2508591 | 8/1987 | Germany . |
| 3709399 | 10/1987 | Germany . |
| 0527639 | 8/1992 | United Kingdom . |

OTHER PUBLICATIONS

"What Is AutoClass? Autoclass is a Knowledge Based System:", *Advertisement literature by Visionshape Inc.*, Orange, California Dann v. Johnston, 425 U.S. 219 pp. 1393–1399, 96 S. Ct. 1393 (1976).

*Primary Examiner*—Leo Boudreau
*Assistant Examiner*—Daniel G. Mariam
*Attorney, Agent, or Firm*—Knobbe, Martens, Olson & Bear, LLP

[57] ABSTRACT

An improved system and method is provided for automatically tracking check transactions and generating an expenditure statement thereof using printed bank checks having a plurality of graphic icons disposed thereon. The customer marks the icon which describes the particular expense for which the check payment is being made. The payor bank or a check processing center scans each check to determine which icon(s) have been marked for each particular check transaction. Recorded expenditures are then automatically recorded in a cumulative transaction record. Periodically, this information is organized into a detailed expenditure statement that can be provided to the bank customer.

34 Claims, 23 Drawing Sheets

April 1995

Monthly Journal

Mark and Mary Land
Acct. #12345

MONTHLY EXPENSES        1995

Auto Expenses

| # 212 | Fred's Tires | $ 26.41 |
| # 217 | Main St. Gas | $ 13.26 |
| # 241 | Sam's Garage | $ 15.47 |
| # 247 | Fast-o-Lube | $ 29.98 |

Groceries

| # 211 | Bob's Grocery | $ 119.36 |
| # 218 | Fastway | $ 137.43 |

Clothing

| # 215 | Fashion Depot | $ 271.65 |
| # 243 | Costume Boutique | $ 362.73 |
| # 251 | Corner Drycleaners | $ 31.42 |
| # 254 | Q-Mart | $ 65.95 |

FIG. 7

METHOD OF DETECTING A MARK ON A ORAPHIC ICON

RELATED APPLICATIONS

This application is a continuation-in-part of U.S. application Ser. No. 08/281,441, filed Jul. 27, 1994.

BACKGROUND OF THE INVENTION

1. Field of the invention

This invention relates to expenditure tracking systems and, more particularly, to an improved automated expenditure tracking system comprising a novel method and apparatus for automatically tracking check expenditures and deposits using printed bank checks having a plurality of graphic icons disposed thereon representative of particular expenditure categories.

2. Description of the Related Art

Millions of people utilize bank checks every day for personal and business use to transact sales of goods and services and to pay bills via funds deposited in a checking or money-market account. Millions more people use Automated Teller Machines ("ATM"), Point Of Sale terminals ("POS") or other Electronic Funds Transfer ("EFT") machines to withdraw or transfer cash electronically in order to make cash purchases and to obtain convenient amounts of cash for discretionary spending.

It is often desirable when making check transactions or ATM or POS withdrawals from a checking account to be able to keep track of and monitor expenditures according to a predetermined set of expenditure categories for purposes of budgeting and/or managing personal or business finances. For instance, it is convenient for a bank checking account customer to know at the end of each month not only how much money is currently available in the customer's checking or money-market account, but also what types and amounts of expenditures have been made during the previous month or several months on such items as food, clothing, entertainment, mortgage, rent, etc. In this manner, a bank customer managing his personal or business finances can identify possible problem areas in which expenses should be reduced in an effort to reduce overall costs and to save money. Such budgeting and monitoring of expenditures is often critical for successful long-term financial planning.

Experience has shown that most individuals fail to plan adequately for their financial future. A recent U.S. Census Bureau survey reports that over 85% of Americans 65 or older are living on an income of less than $10,000.00 per year. The majority of these households, however, earned enough income to set aside for more than an adequate retirement investment, but failed to do so. Unfortunately, many working individuals today are following the same trend toward future financial insecurity. Particularly in the hectic modern-day world of two income families and even greater financial pressures, it is absolutely essential to be able to monitor expenditures and investments in order to provide for a sound financial future.

The U.S. Small Business Administration has similarly noted that a large percentage of all new small businesses fail within the first year of operation. This is partially attributable to a lack of adequate financial planning and monitoring of expenditures by relatively inexperienced business managers. Without adequate budgeting and monitoring of business expenses, the cash flow of even a moderately successful business can be quickly subsumed by losses from poor investments and wasteful spending. Again, budgeting and monitoring of expenditures is critical to the financial well being of small businesses.

One of the main reasons individuals and small businesses fail to adequately plan their finances is the current lack of a convenient mechanism for budgeting and monitoring expenditures and investments. Larger businesses and more affluent individuals hire accountants and other professionals to budget and monitor their expenditures. But many working individuals and small businesses simply cannot afford such personalized professional services. These individuals and small businesses either perform these accounting services themselves or go without them.

For those individuals and small businesses that choose to perform their own accounting services, several tools have recently become available. Most notable are several computer accounting software programs that are now readily available to assist individuals and small businesses in personal and business financial planning. Typically, such software programs can be used with a personal computer or similar device capable of performing basic financial computations.

One particularly popular computer accounting software program is marketed under the name "Quicken™" and is available from Intuit, Inc. of Menlo Park, Calif. This program allows users to assign expenditure account categories by entering a text description of each into the program's database. For each check transaction, the user then identifies the appropriate account category and types in the check number and check amount. Once the information has been entered into the computer, it can be manipulated electronically to generate various types of account statements, expenditure charts and the like, which can be accessed by the user via a video display monitor, an attached printer or magnetic disk storage media. Deposits and other transactions are handled in a similar fashion by the user's manually entering the raw data from the deposit slip, transaction receipt or the like, into the computer.

A significant drawback of these types of computer accounting software programs is that they require the bank customer or user to enter into the computer "raw" data from each check transaction occurring within a given transaction period. This data may, for instance, be entered by the bank customer from his returned checks or from a separate ledger book in which check transactions are routinely entered and recorded inputting this data may require a considerable expenditure of time and effort where, for instance, the bank customer has made hundreds of individual check transactions during a given transaction period.

This secondary data entry step is also highly inconvenient. Experience has shown that, while many people want financial management tools, most lack the time and discipline necessary to maintain accurate financial records on their own. Busy families, individuals, and small businesses demand accurate financial reporting in order to reach their financial goals, but they often do not want to expend the significant amounts of time and effort required to maintain such records themselves. Many individuals, in particular, find the use of a personal computer or a keypad highly inconvenient for entering and recording check expenditure information. Recent statistics indicate that almost half of all American households are intimidated by computers. Other bank customers simply do not have access to a computer and, therefore, cannot benefit from these types of computer accounting software programs.

Even among those individuals and small businesses who own a computer and who have purchased accounting or financial planning software, research has shown that a significant percentage of them are not consistent with their inputting and reporting of check transactions. Quite often, after several months of neglect these computer software users, faced with many hours of "catch-up" work, abandon their bookkeeping tasks altogether. The result is that the computer software goes largely unused, defeating the very purpose of budgeting and financial planning.

Other expenditure tracking systems have been proposed in which the bank check, itself, can be labeled or marked by a bank customer with numbered expenditure categories. Upon presentment of such a check for payment, the bank teller reenters the expenditure category number in magnetic code ("MICR") on the bottom of the check. The check is then processed using a MICR decoder. A centralized computer records the transaction amount and expenditure category number for each check and provides the customer with a periodic statement of expenditures. In this manner, the labor intensive step of re-entering expenditure account information into a computer is, in effect, shifted from the customer to the bank.

A drawback of these types of expenditure tracking systems, however, is that they are not well suited for individual and small business. Specifically, the numbers used to represent expenditure categories are not easily identifiable by customers as representing any particular type of expenditure. Rather, in order to record the appropriate category number a customer is required to refer to a separately recorded index or legend of accounts in order to match each number with its corresponding expenditure category. This cross-referencing of expenditure categories is highly inconvenient where, for instance, the customer does not have convenient reference to the recorded legend at the time the check is made out and the transaction executed. In such cases the customer either guesses, or he simply does not record the expense at all. This can cause undesirable inaccuracies in the expenditure tracking system. Numbered expenditure categories are simply not sufficiently intuitive or descriptive to allow the use of these types of expenditure tracking systems by the general banking public.

Another significant disadvantage with prior art expenditure tracking systems in general is that they cannot adequately account for ATM and POS transactions, which occupy an increasingly larger percentage of checking and money market account transactions. To account for such transactions a customer must keep a copy of all receipts and then separately record them in either a written ledger or computer data base and reconcile these receipts with their bank statement at the end of each month or other financial period. Again, this takes time and effort and can result in undesirable inaccuracies as customers fail to stay current with recorded expenditure information.

Each of the above prior art systems require bank customers and/or the bank itself to perform secondary data entry operations, either in a separate account ledger or via a computer or MICR encoder keypad, in order to provide accurate monitoring of expenditures. It would represent a significant advance in the art to provide an automated expenditure tracking system which eliminates the need for such secondary data entry. It would represent a further advance in the art to provide such a system that is easy and inexpensive to use, is intuitive and easy to understand even in cross-linguistic environments without the need for special instructions or training, and that maintains consistent reporting regardless of a customer's level of diligence in recording individual expenditures.

SUMMARY OF THE INVENTION

The present invention comprises, in one embodiment, a printed bank check having a plurality of easily recognizable graphic icons disposed thereon representative of predetermined expenditure categories. Each icon is adapted to be marked by a customer and machine-read in order to track and record individual check transactions. Preferably, each icon consists of an ergonomically designed pictorial representation of a particular object or idea which is familiar to the customer and which is associated with each type of expenditure. Additional expenditure information may optionally be provided on the back of each check in order, for instance, to allow a bank customer to allocate a single check transaction between one or more expenditure categories or to record one or more deposits, as desired.

In another embodiment, the present invention provides a novel printed graphic icon for enhancing the detectability of a mark made thereon. The icon is provided with a defined marking area intended to receive a customer's mark. The periphery of the intended marking area is defined by a dark outer portion forming an outline or inverted silhouette of the icon design. Shading, highlighting, and other details are provided within the inverted silhouette area using a light colored ink and/or tones, defining a relatively light inner portion. These details aesthetically enhance the icon design and provide improved recognition of the icon by a customer. The light inner portion of the icon is selected to be below the threshold detection level of a scanner or other device used to scan the icon design into a computer imaging system such that only extraneous marks made by a bank customer appear as dark areas within a pixel image of the intended marking area.

In another embodiment the present invention provides a printed graphic icon adapted to be invisible to a scanner, yet readily recognizable to the human eye. The icon is defined by an outer portion forming an outline or inverted silhouette of a desired icon design. Shading, highlighting, and other details of the icon design are provided in an inner icon portion within the inverted silhouette. These details aesthetically enhance the icon design to provide improved human recognition thereof. Both the outer and inner icon portions are printed or screened using a suitable "drop-out" ink having a light absorptivity that is below a defined threshold detection level of a scanner such that any extraneous marks made on the icon will appear as dark contiguous pixels within a bi-level pixel image of the icon. Optionally, "drop-out" icons may be enclosed within, a thin, black frame so that when scanned the resulting pixel image will reveal only the icon frame and any marks made therein.

In another embodiment, the present invention provides a novel method for detecting the presence of a mark placed over a printed graphic icon as provided in accordance with the present invention. The icon is scanned via a scanner or other device into a computer imaging system to produce a bi-level black and white pixel image of the icon. A mask having a size and shape corresponding to the dark outer portions of the icon design is placed over the pixel image of the icon such that it masks the entire pixel image outside of the intended marking area of the icon. A mark is detected if more than a predetermined number of contiguous dark pixels are detected within the remaining pixel image, corresponding to the intended marking area of the icon.

In another embodiment, the present invention provides a novel method for detecting the presence of a mark placed over one of a number of printed graphic icons provided in an array. The icon array is scanned via a scanner or other device into a computer imaging system. The computer registers the icon array on an x-y grid by recognizing and locating a target comprising one or more predetermined reference lines. A mark is detected in a particular icon location if more than a predetermined number of contiguous dark pixels are detected within a portion of the pixel image corresponding to the x-y location of the particular icon.

In another embodiment, the present invention comprises a system and method for automatically tracking expenditures using pictorial icons at the point of sale/payment representing expenditure categories which can be marked or otherwise activated by a customer to indicate a particular expenditure category. A bank customer selects the icon or icons which apply to the particular transaction for which the expenditure transaction is made. This information is recorded in a cumulative transaction record. Periodically, the transaction record is organized into a statement of expenditures broken down by expenditure category and amount which may be provided to the bank customer in the form of an end-of-month expenditure statement or electronic data downloaded via modem or other means to a home or business computer.

In another embodiment, the present invention comprises a system and method for processing bank checks of the type adapted to be marked by a bank customer to indicate a selected expenditure category corresponding to a particular check expenditure. Basic check transaction information, such as the account number and the dollar amount of each bank check, is decoded using a MICR decoder. Checks are then scanned in substantially rapid succession to generate a series of binary data representative of a pixel image thereof. An central processor manipulates the binary data to detect in each of a plurality of predetermining intended marking areas on the check the presence or absence of one or more marks indicative of particular expenditure categories selected by a bank customer. Transaction information is then recorded in a cumulative transaction record in association with each selected expenditure category corresponding to each particular check transaction. Periodically, the transaction record is organized into a statement of expenditures broken down by expenditure category and amount which may be provided to the bank customer in the form of an end-of-month expenditure statement or electronic data downloaded via modem or other means to a home or business computer.

In another embodiment, the present invention comprises a novel expenditure statement in which a pixel image of each payee name recorded on a bank check is reproduced directly on the expenditure statement in association with corresponding transaction information, such as customer's account number, check transaction number and the dollar amount of the check.

Other features and advantages of the present invention will become readily apparent to persons skilled in the art having reference to the drawings herein and the detailed description that follows.

BRIEF DESCRIPTION OF THE FIGURES

By way of example and to make the following detailed description more clear, reference is made to the accompanying drawings, of which:

FIG. 7 is a front view of an expenditure statement of the type generated by a check expenditure tracking system of the type shown in FIG. 6, and having features of the present invention;

DETAILED DESCRIPTION

1. Printed Bank Check

Figure 1:
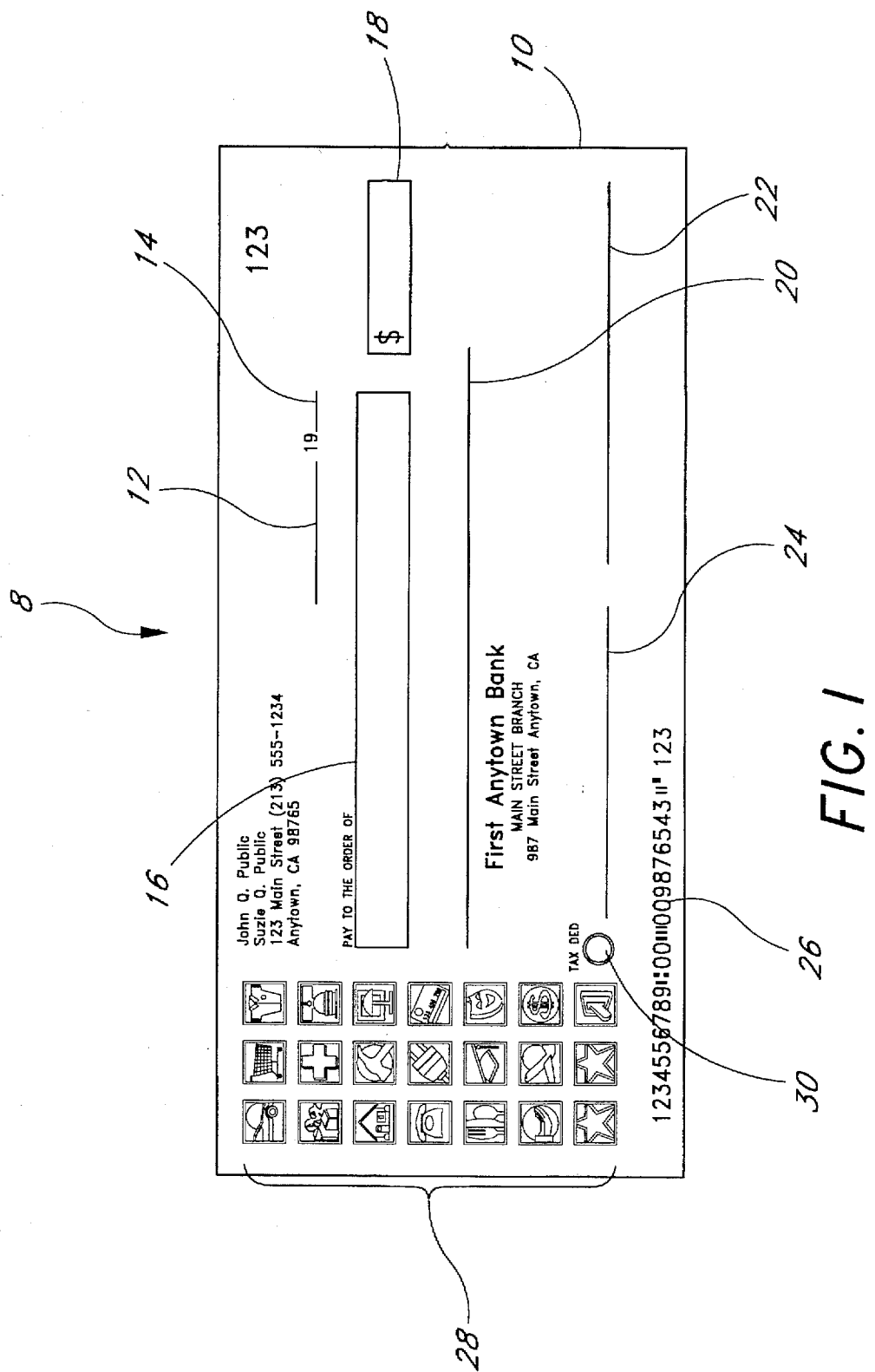
FIG. 1 is a view of the front side of a printed bank check having features of the present invention.

FIG. 1 is a view of the front side of a printed bank check 8 having features of the present invention. The check generally comprises a substrate 10 upon which is printed a plurality of boxes, lines, and spaces 12–24 for entering customary check-transaction information. An array of graphic icons 28 is provided for recording one or more expenditure categories which correspond to the particular transaction being made, as will be described in more detail later.

In accordance with industry custom a magnetic ink character recognition code ("MICR" code) 26 is printed at the bottom of the check substrate 10. The MICR code 26 contains machine readable information consisting of the bank routing number, customer account number, and the check transaction number. The dollar amount of the check may also be recorded in MICR code (not shown) on the check by a payee bank when the check is cashed or deposited by the payee. The MICR code 26 is used primarily in automated check clearing houses to route the check and charge it against the proper payor bank. It is also used by the payor bank to automatically credit and debit individual customer accounts and to periodically generate a statement of accounts identifying each customer's transactions by check transaction number along with the remaining balance of the customer's account.

The size and weight of the check substrate 10 may be varied as desired, but preferably conforms to one of several well-known banking industry standards. For instance, a 24# weight 2.75"×6" rectangular substrate 10 is convenient for personal use. A 24# weight 3"×8.25" inch check substrate 10 is convenient for certain business and professional use. For relatively high volume or computer controlled check writing it may be further convenient to provide multiple checks printed on a single perforated substrate that is particularly adapted for use with a computer controlled printer. Alternatively, it will be readily apparent to persons skilled in the art that virtually an infinite number of shapes and sizes of substrates 10 may be used, as desired, while still enjoying the benefits of the present invention herein disclosed.

Optionally, the check substrate 10 may be further provided with a security pattern or other design disposed thereon for discouraging fraudulent reproduction of checks or providing an aesthetic or ornamental check design. For instance, it will be seen that the check substrate 10 illustrated in FIG. 1, has been lightly printed with the mark "OnTRACK™" in a repeating pattern covering substantially the entire front side of the substrate 10. It will be readily apparent to those skilled in the art that a wide variety of optional background designs may be used, as desired, while still enjoying the benefits of the present invention herein disclosed.

As briefly noted above, a plurality of boxes, lines, and spaces 12–24 are provided on the front side of the substrate 10 for entering customary check-transaction information. The current day and month may be entered on line 12, the year on line 14. The payee's name may be entered in the payee box 16. The dollar amount of the check may be entered in arabic numerals in the amount box 18 and written out in long-hand on the verification line 20. The maker of the check signs on line 22. Notes or other extraneous information may be recorded on an optionally provided memo line 24.

The payee box 16 is preferably adapted to be electronically scanned into a computer imaging system or other device such that the text image within the box 16 can be captured in pixel form and reproduced, as desired, in an expenditure statement or other accounting statement provided to a bank customer. The particular size and shape of the payee box 16 may be varied, as desired, to provide a convenient area for recording the payee's name. The payee box 16 is preferably at least minimally sufficient to accommodate both handwritten and typed payee designations. A payee box having a height of 5/16 inches and a length of 3 inches, for instance, provides a convenient size for most check-writing purposes. Other payee box dimensions may be used, as desired, while still enjoying the benefits of the present invention herein disclosed. The outer frame comprising the payee box 16 is preferably of relatively uniform line thickness and density. Optionally, it may be screened using a half-tone printing technique or other means, as desired, in order to lighten the outer frame. In this manner, when the check 8 is scanned into a computer imaging system the outline image of the payee box 16 can be filtered out using threshold imaging, as will be described in more detail later.

The amount box 18 is similarly adapted to be electronically scanned so that the text image within the box 18 may be captured in pixel form. Preferably a handwritten or typed dollar amount in the amount box 18 may be verified against the dollar amount contained in the MICR code 26 using a modified optical character recognition ("OCR") technique, as will be described in more detail later. As with the payee box 16, described above, the size and shape of the amount box 18 can be varied, as desired, but is preferably at least minimally sufficient to accommodate both hand-written and typed dollar amounts. An amount box 18 having a height of 0.25 inches and a length of 1.00 inch provides a convenient size for most check-writing purposes. Alternatively, a larger or smaller amount box 18 may be provided, as desired, while still enjoying the benefits of the present invention herein disclosed. The outer frame comprising the amount box 18 is preferably of relatively uniform line thickness and density. Optionally, it may be screened using a half-tone printing technique or other means, as desired, in order to lighten the outer frame such that the outline image of the amount box 18 can be filtered out using threshold imaging, as will be described in more detail later.

An array of twenty-one unique graphic icons 28 is provided on the left-most side of the check, as shown. It will be appreciated that each of the individual graphic icons in the icon array 28 represents a particular category or type of expenditure, such as, for instance, automotive expenses, groceries, meals, etc. A customer desiring to record a particular check expenditure marks the icon (or icons) in the icon array 28 that correspond to the particular expense for which the check payment is being made. The expenditure category information is thereby permanently recorded on the check itself at the time the transaction is made.

One or more optional icon boxes, such as the circular box 30, may also be provided, as desired, to further characterize a given check expenditure as being, for instance, either tax deductible or reimbursable. Such optional boxes may be located immediately adjacent to the icon array 28, as shown, or, alternatively, at any convenient location on the check substrate 10 that would not encroach on other zones of the check that preferably conform to banking industry standards. Any such optional icon boxes 30 may be provided with or without a corresponding icon design or text description, as desired.

The icon array 28 and any optional icon boxes 30 are preferably adapted to be scanned into a computer imaging system or other device so that the image can be processed in order to ascertain which icon(s), if any, have been marked. This information is then recorded in association with other information representative of the particular check transaction, such as the customer account number, check transaction number and dollar amount of the check. A bank or processing center periodically organizes this recorded information into a statement of expenditures or an accounting broken down by expenditure category, check transaction number and amount. Preferably, this is in the form of a monthly expenditure statement provided to the bank customer. Alternatively, it may be a statement of year-to-date expenditures, or any other breakdown of expenditures that a bank customer may find convenient or helpful for purposes of budgeting or financial planning. In this manner, it will be appreciated that each check expenditure made using a printed bank check in accordance with the present invention may be automatically tracked and recorded, as will be described in more detail later.

A customer desiring to purchase groceries at a grocery store, for instance, might write out a check for $50 to pay for the groceries, marking an icon on the check picturing a grocery cart or other indicia representative of grocery expenses. Once the transaction is completed and the check is presented for payment, the payor bank, a check clearing house or a designated processing center scans each check to determine selected expenditure categories and records this information in association with other basic information identifying the transaction. This may be done either before or after the check is paid and canceled, as desired.

For multiple purchases using a single check transaction customers may wish to allocate or "split" the transaction between two or more discrete expenditure categories. If, for example, the customer attends an educational luncheon which he pays for using a single check, the customer may wish to split the check expenditure between meal expenses and educational expenses. The customer may do this by placing an "X" or other mark on each icon in the icon array 28 that is applicable. The check expenditure would then be automatically allocated equally among each expenditure category indicated.

On the other hand, a customer may not wish to split the check evenly. Assume, for instance, that a customer picks up a video cassette at the grocery store and pays for its rental fee along with his weekly groceries. The transaction should properly be recorded as partially attributable to groceries and partially attributable to personal entertainment expenses. Accordingly, an optional feature of the present invention is to provide on the back of a bank check as shown in FIG. 1 a plurality of optional lines and boxes, as illustrated in FIG. 2, for distributing a single check transaction between multiple expenditure categories.

Figure 2:
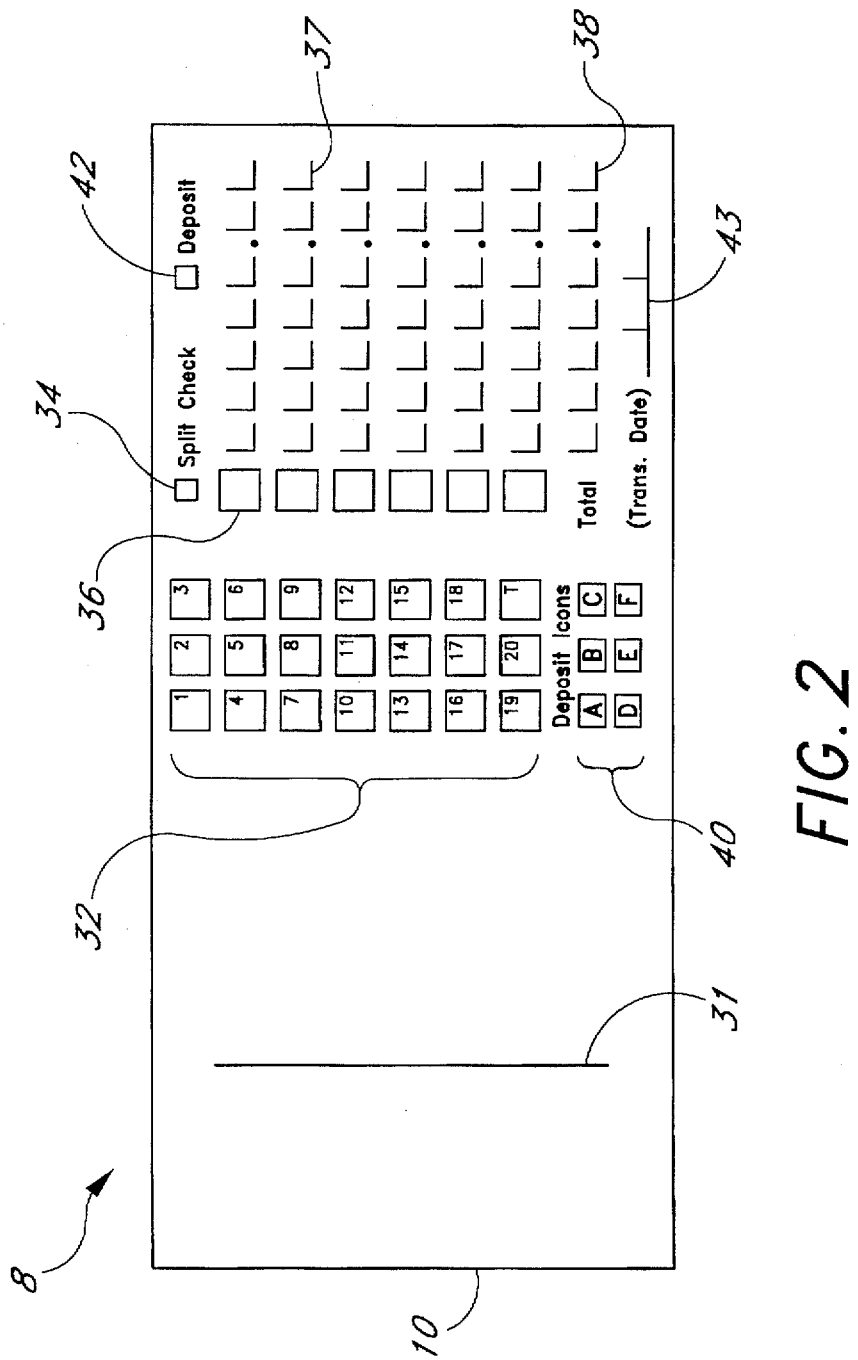
FIG. 2 is a view of the back side of a printed bank check having optional features in accordance with the present invention.

FIG. 2 is a view of the back side of a printed bank check 8 having this optional feature in accordance with the present invention. On the left side of the back of the check is provided a customary endorsement area demarcated by the line 31, above which endorsements may be made. An empty space is preferably provided in the area immediately to the right of the endorsement line 31 in order to accommodate bank processing information which may be subsequently printed on the back of the check. Further to the right is provided a second array of twenty-one icons 32 corresponding to the icon array 28 shown in FIG. 1. These icons in the array 32 may or may not be provided with corresponding graphic icon designs, as desired, depending upon the additional printing expenses involved. Preferably, each icon box in the icon array 32 has a unique icon position number or letter associated with it, as shown, corresponding to each particular expenditure category represented pictorially by corresponding icons in the icon array 28 shown on the front of the check.

If a customer desires to allocate a particular check transaction between two or more expenditure categories, the customer marks the box 34 indicating "split check" and enters the appropriate icon position numbers in the column of boxes 36 provided. Next to each icon position number, the customer then enters in the corresponding spaces 37 the dollar amount portion of the check transaction which is to be allocated to that particular expenditure category. This is repeated for each different expenditure category desired. The total is then added up and entered in the space 38 provided. This total will usually correspond to the amount recorded on the front of the check.

Optionally, it is further envisioned that split-check information may be recorded on any subsequent check used to pay for goods and/or services, as desired, provided that the check transaction to be split is sufficiently identified by date and dollar amount, as provided in the spaces 43 and 38, respectively. This feature is convenient, for instance, for hurried transactions where the bank customer does not have time or otherwise forgets to record check-split information on the back of a particular check. Advantageously, this feature allows the bank customer to record split-check information on any subsequent check, as desired, and the information will be automatically entered by the expenditure tracking system. If necessary, optional spaces (not shown) may be provided on the back of the check for indicating the check transaction number of the particular check to be split. This is usually not necessary, however, since it is usually possible to identify the intended split-check according to transaction date and dollar amount.

Check deposits are handled in a similar fashion in that the back of any particular check may be used to record various deposits which the bank customer has previously made. Accordingly, an array of optional deposit icons 40 is provided on the back of the check, as shown, and assigned a unique letter or number designating the source of deposited funds. Again, these icons in the array 40 may or may not be provided with corresponding graphic icon designs, as desired, depending upon the additional printing expenses involved and the desirability of using graphic images to designate the source of funds deposited. The customer marks the box 42 indicating that a deposit is being recorded. He then enters the appropriate deposit icon letter(s) in the column of boxes 34, designating the source of deposited funds, and enters the dollar amount of each check being deposited in the corresponding spaces 37 provided. The day, month and year of the deposit is entered in the boxes 43 provided. In an optional embodiment, it is further envisioned that the back of the check, itself, may be used as deposit slip.

Preferably, the back of the check is adapted to be scanned and processed substantially in the same manner as with the front of the check. Specialized OCR software, such as that available from Visionshape® of Orange, CA, is used to analyze and/or read the hand-written letters or numbers entered in the boxes 36 and dollar amounts entered in the corresponding spaces 37. Alternatively, these portions of the check may be processed and read manually by visual inspection of the back of the check itself or a pixel image thereof, as desired.

Advantageously, it will be appreciated that a bank customer using a printed bank check in accordance with the present invention can track his monthly expenditures without having to perform any secondary data entry steps. All of the expenditure category information may be recorded by the bank customer on the check, itself, contemporaneously with the check transaction.

In an optional embodiment of the present invention, expenditure tracking information may be downloaded directly from a bank or processing center, as desired, via modem or other means to a home or business computer for use with other accounting or expenditure tracking software.

In this manner it will be appreciated that a bank customer can have the flexibility of using his favorite computer accounting program to budget and monitor expenditures without having to perform secondary data entry of check transactions. A wallet-size reference card showing icons and superimposed numbers may be further provided for later account adjustments using a telephone or computer network system, as desired, or for manually annotating receipts of petty cash expenditures.

Figure 3:
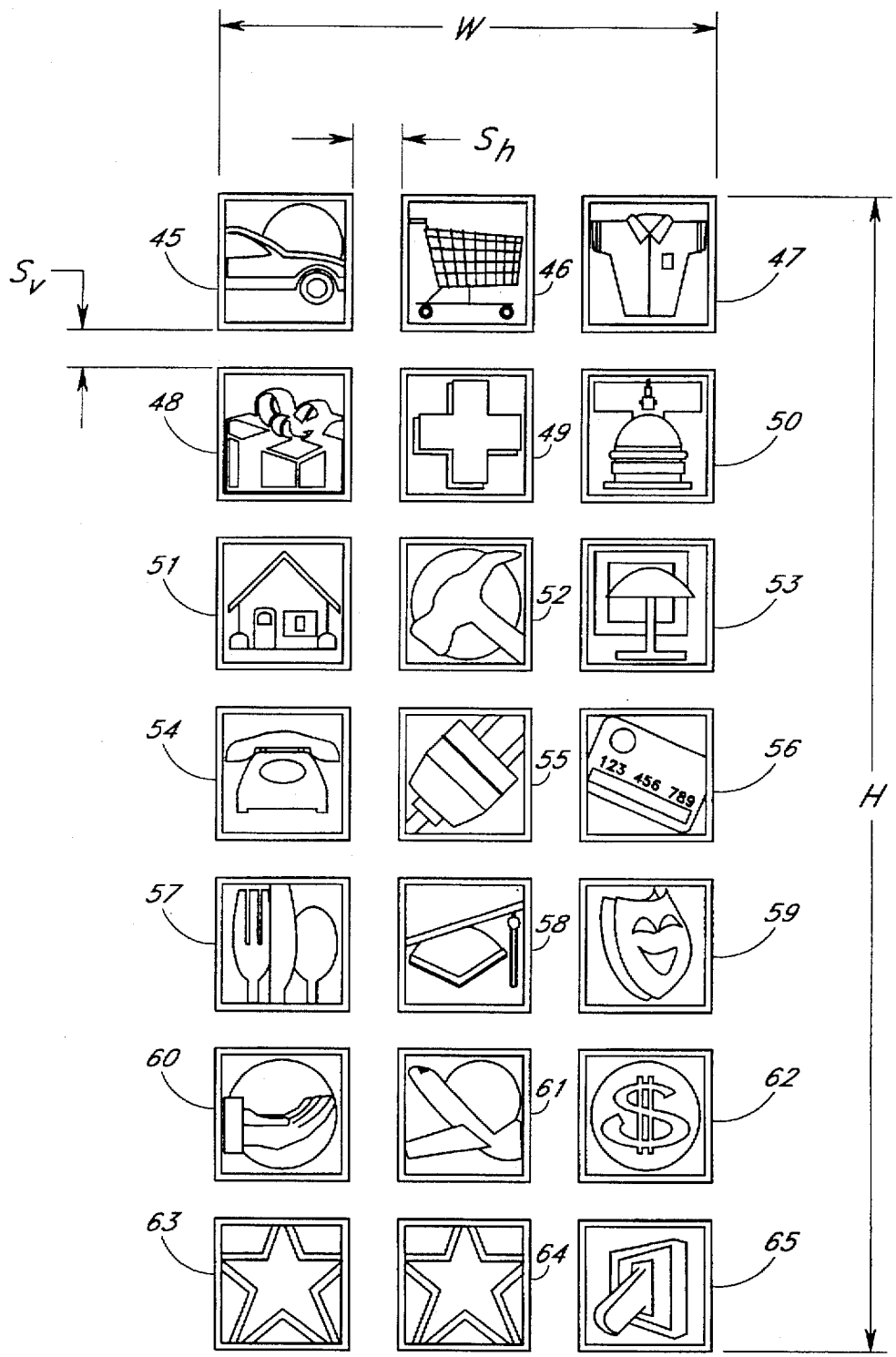
FIG. 3 is an enlarged view of the icon array 28 shown in FIG. 1 illustrating in more detail a number of possible graphic icon designs that may be provided on a printed bank check in accordance with the present invention.

FIG. 3 is an enlarged view of the icon array 28 shown in FIG. 1, illustrating in more detail a number of different possible graphic icon designs that may be provided on a printed bank check in accordance with the present invention. Alternatively, it is envisioned that bank checks having different types or numbers of icons may be provided, as desired, to suit the needs of particular customers according to whether, for instance, the customer is an individual, household, or business. For custom applications, it is further envisioned that customers will be able to choose from a predetermined selection of custom graphic icons, which are then arranged on a bank check, as desired. Certain bank customers will find it convenient to design their own icon array 28 when it is necessary or desirable, for instance, to indicate special or unusual expenditures peculiar to that individual bank customer. In any event, it will be readily understood by those persons skilled in the art that a variety of graphic icon designs may be used on a printed bank check to represent any particular group of expenditure categories in accordance with the present invention herein disclosed.

A conventional 2.75"×6" bank check can support an icon array 28 having a height "H" of about 2 inches and a width "W" of about 1 inch without encroaching into other zones of the check that preferably conform to banking industry standards, as illustrated in FIG. 1. Alternatively, other shapes or sizes of icon arrays 28 may be used, as desired, while still enjoying the benefits of the present invention. The size and shape of individual icons within the icon array 28 may also be varied, as desired, but are preferably no smaller than about 0.20"×0.20" in order to ensure ease of recognition by bank customers. The number of icons in the icon array 28 may be varied, as desired, while still enjoying the benefits of the present invention. For instance, it is believed that anywhere from about five to fifty and, more preferably, from about ten to thirty icons may be used to indicate various expenditure categories, as desired. In a particularly preferred embodiment, twenty-one icons each measuring 0.25"×0.25" are arranged in three columns of seven rows each, as shown. This particular arrangement of icons is convenient for a wide variety of expenditure tracking purposes. For business checks, additional icons may be provided by adding one or two additional columns of seven icons each, as needed.

Individual icons in the icon array 28, shown in FIG. 3, are preferably separated by a clear space of between about 0.020 inches and 0.050 inches vertically ($S_v$) and between about 0.050 inches and 0.150 inches horizontally ($S_h$). More preferably, icon rows are separated by a vertical clear space $S_v$ of about 0.0334 inches and icon columns are separated by a horizontal clear space $S_h$ of about 0.0917 inches. It will be appreciated that these clear spaces provide a buffer for marks which may extend beyond a particular icon box. A wider horizontal clear space $S_h$ separating each column of icons in the icon array 28 is preferred in order to provide additional room for compensating any horizontal image distortion caused by horizontal feeding of checks through a high-speed scanner, as will be described in more detail later. Alternatively, for vertical feeding of checks through a high-speed scanner it may be desirable to provide a wider vertical clear space $S_v$ between each row of icons in the icon array 28 in order to allow for compensation of any vertical image distortion.

The icon array 28 shown in FIG. 3 is typical for individuals and household bank customers. While the individual icons shown in FIG. 3 are particularly suited for indicating corresponding expenditure categories, as will be described below, it will be readily understood by those persons skilled in the art that a wide variety of other icon designs may be used, as desired, to indicate the same or similar expenditure categories while still enjoying the benefits of the present invention. A brief description of the icons shown in FIG. 3 is provided below for purposes of illustration only.

Beginning in the upper left hand corner, icon 45 illustrates a sun setting behind the front end of an automobile. This icon design may correspond, for instance, to automotive expenditures, such as routine maintenance, oil changes, gasoline, etc. Alternatively, any other image associated with automotive expenses may be used to represent such expenditures, such as an oil can, a gas pump, or the like. To the right, icon 46 illustrates a basket-type grocery cart with wheels. This icon design may correspond, for instance, to expenditures made for groceries, laundry detergent and other items typically purchased at a grocery store. Alternatively, any other image associated with groceries or grocery stores may be used, such as a loaf of bread, a can of soda, etc., to represent such expenditures. Further to the right, icon 47 shows a short-sleeve sports shirt. This may correspond, for instance, to expenditures made for purchasing and cleaning of clothing. Alternatively, separate icons may be used to represent expenditures for clothes purchases and for cleaning services, as desired.

In the second row first column, icon 48 shows a gift box wrapped with a bow. This icon design may correspond, for instance, to expenditures made for gifts and presents. Alternatively, any other image associated with gift giving, such as a birthday cake, a Christmas tree, etc., may be used to represent such expenditures. To the right, icon 49 shows a cross. This icon design may correspond, for instance, to expenditures made for medical services. Alternatively, any other image associated with medical services, such as a doctor, nurse, stethoscope, etc., may be used to represent such expenditures. Further to the right, icon 50 shows a picture of a capitol building superimposed on a large "T". This icon design may correspond, for instance, to expenditures made for income taxes or FICA withholdings. Alternatively, any other image associated with payment of taxes or social security, such as a representative tax form, tax collector, Uncle Sam, etc., may be used to represent such expenditures.

In the third row first column, icon 51 shows a small house having a window and a door. This icon design may correspond, for instance, to housing expenditures, such as a mortgage or rent payments. Alternatively, any other image associated with housing expenditures, such as a deed, a bank, a landlord, etc., may be used to indicate such expenditures. To the right, icon 52 shows a hammer extending into a circular background. This may correspond, for instance, to expenditures made for routine home maintenance, home improvements, tools, etc. Alternatively, any other image associated with home maintenance and improvements, such as a paint brush, handyman, etc., may be used to indicate such expenditures. Further to the right, icon 53 shows a lamp on a table in front of a picture frame. This icon design may correspond, for instance, to expenditures made for home furnishings, household decorating expenses and the like. Alternatively, any other image associated with furniture or home decorating, such as a lounge recliner, wall paper, carpeting, etc., may be used to represent such expenditures.

In the fourth row first column, icon 54 shows a telephone. This icon design may correspond, for instance, to expenditures made for phone services. Alternatively, separate icons may be used, as desired, to indicate both local and long distance as well as cellular phone expenses. To the right, icon 55 shows an electrical plug of the type found on small electrical appliances. This icon design may correspond, for instance, to expenditures made for electricity or electrical service. Alternatively, any other image associated with electricity or electrical service, such as an electrical socket, a lightning bolt, or the like, may be used, as desired, to represent such expenditures. Further to the right, icon 56 shows a charge or credit card having a circle design, a magnetic strip and a charge number. This icon design may correspond, for instance, to expenditures made for credit card or charge cards. Alternatively, the front of an actual credit or charge card, such as a Visa™ or Mastercard™, may be used to indicate such expenditures.

In the fifth row first column, icon 57 shows a set of eating utensils. This icon design may correspond, for instance, to expenditures made for meals or restaurant services. Alternatively, any other image associated with restaurant services, such as a waitress, maitre d' or the like, may be used to represent such expenditures. To the right, icon 58 shows a cap and tassel of the type used in graduation commencement ceremonies. This icon design may correspond, for instance, to expenditures made for educational purposes, such as college tuition, seminars, and similar expenditures. Alternatively, any other image associated with educational expenses, such as books, calculators, computers and the like, may be used, as desired, to represent such expenditures. Further to the right, icon 59 shows a theater mask. This icon design may correspond, for instance to entertainment expenses such as movies, theater, comedy clubs and the like. Alternatively, any other image associated with entertainment, such as a movie projector, a circus big-top, a martini, etc., may be used to represent such expenditures, as desired.

In the sixth row first column, icon 60 shows an open hand extending into a light circular background. This icon design may correspond, for instance, to expenditures made for charitable purposes. Alternatively, any other image associated with charity or charity fund-raisers, such as a homeless person, Shriners cap or a United Way symbol, may be used to represent such expenditures, as desired. To the right, icon 61 shows an airplane ascending into the sunset. This icon design may correspond, for instance, to expenditures for travel, such as air travel, cruises, trains, etc. Alternatively, any other image associated with traveling or vacations, such as a cruise ship, a train, a map or the like, may be used, as desired, to represent such expenditures. Further to the right, icon 62 shows a large dollar sign within a light circular background. This icon design may correspond, for instance, to expenditures made for investment purposes. Alternatively, any other image associated with investments, such as a diamond, a ticker tape machine, etc., may be used to represent such expenditures, as desired.

The bottom row of icons 63–65 are special function icons provided for added check-writing flexibility. The two "star" icons 63 and 64 are user-definable icons. Icon 63 is a dark star and icon 64 is a light star, as shown. These icons may correspond, for instance, to a particular type of expenditure transaction that does not readily fall within one of the other expenditure categories indicated. These may be expenditures peculiar to a particular bank customer or they may be unusual, one-time-only expenses such as, for example, wedding expenses or legal expenses. Alternatively, any other symbol, such as letters, numbers, etc. may be used to indicate these user-definable expenditure categories.

To the right, icon 65 shows a toggle switch. This icon design may be used, for instance, in a similar fashion to a function key (i.e., SHIFT/ALT/CTRL) on a computer keypad, to indicate an extended or alternative list of icon expenditure category choices which may be recorded on a separate card or known to the bank customer personally. For example, an unmarked toggle icon 65 may indicated household expenditures, while a marked toggle icon may indicate business expenditures, each according to its own particular icon array, as desired. Alternatively, the toggle icon 65 may be used to indicate, for example, whether the check expenditure was made by the husband or wife in the case of a jointly held checking account. For instance, checks with the toggle icon 65 marked may indicate that the particular check expenditure was made by the husband. An unmarked toggle icon 65 may indicate that the check expenditure was made by the wife. Alternatively, any other image associated with this or any other desired function made be used as desired, such as a "T" or a picture of a "SHIFT" or "ALT" key, etc.

Figure 16:
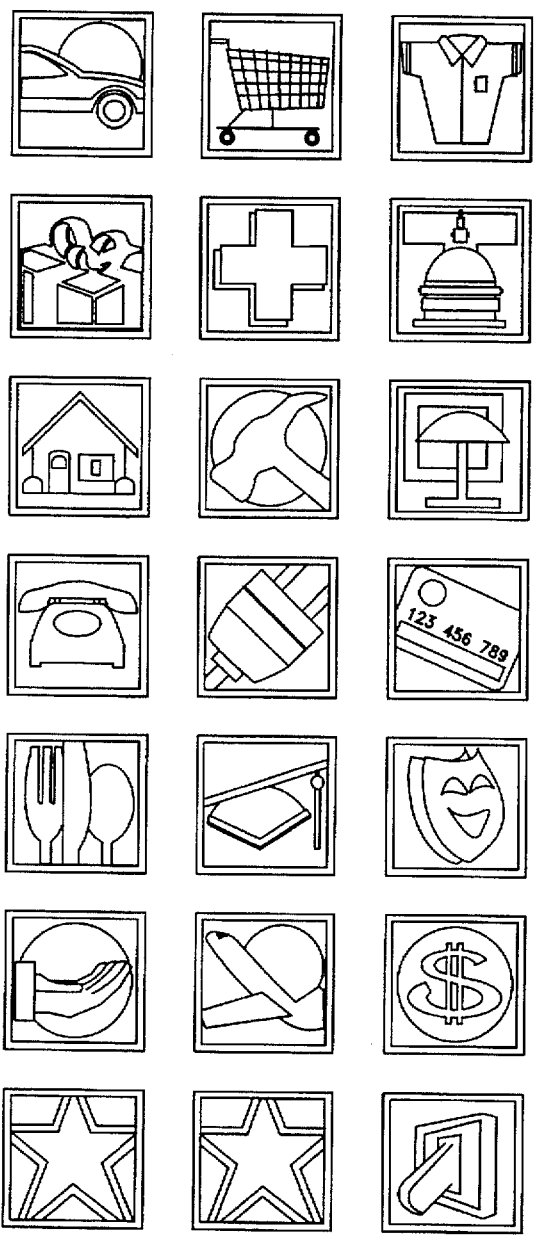
FIG. 16 is an enlarged view of the icon array of FIG. 3 illustrating in more detail the preferred shading of the various icons.
Figure 17:
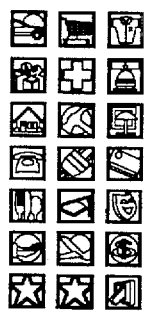
FIG. 17 is a view of the icon array of FIG. 16 shown in actual preferred size.

FIG. 16 is an enlarged view of the icon array of FIG. 3 illustrating in more detail the preferred shading of the various icons. FIG. 17 is a view of the icon array of FIG. 16 shown in actual preferred size.

Figure 18:
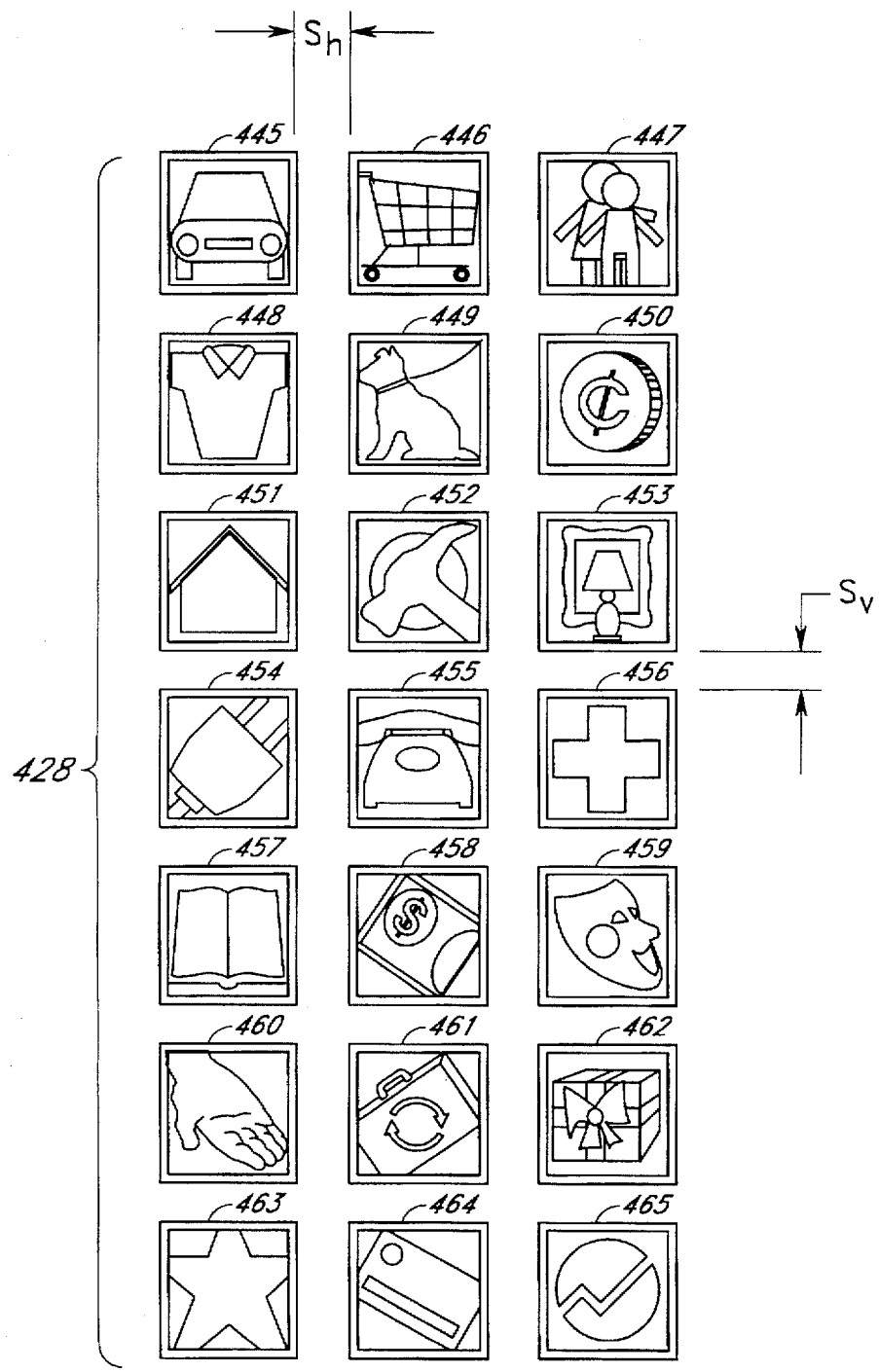
FIG. 18 is an enlarged view of an alternative embodiment of a printed icon array having features of the present invention.

FIG. 18 is an enlarged view of an alternative embodiment of a printed icon array having features of the present invention. The icon array of FIG. 18 is generally similar to that illustrated and described above in connection with FIG. 3. Those skilled in the art will recognize, for instance, that the icon 445 in FIG. 18 corresponds to the car icon 45 shown in FIG. 3, although the shape and shading of the icons are different. Similarly the telephone icon 455 in FIG. 18 corresponds to the icon 54 in FIG. 3, although the shape, shading and positioning of the icons are different.

The variety of icons illustrated demonstrates the flexibility involved in selecting different icons to suit individual customer needs. A brief description of several of the more unique icons shown in FIG. 18 is provided below for purposes of illustration only. Beginning in the top row, right-most column, icon 447 shows the silhouette of children. This icon may correspond, for instance, to expenditures related to child rearing or day care costs. Alternatively, any other image associated with child rearing expenses, such as a baby crib or cradle, crying baby, pacifier, etc., may be used to represent expenses related to child rearing.

In the second row down, second column from the left, icon 449 shows a dog on a leash. This icon design may correspond, for instance, to expenditures related to pet care or veterinary services. Alternatively, any other image associated with pets or veterinarian services, such as a goldfish in a bowl, a bird cage, dog bone, etc., may be used to represent such expenditures, as desired. To the right, icon 450 shows a coin. This icon design may correspond, for instance, to small household expenditures, such as for light bulbs, household cleaners, etc. Alternatively, any other image associated with small household expenditures, such as a thumbtack, tape dispenser, scissors, bleach bottle, etc., may be used to represent such expenditures, as desired.

In the fifth row down, second column from the left, icon 458 shows a folded dollar bill. This icon design may correspond, for instance, to expenditures related to a cash allowance, discretionary spending money, or miscellaneous purchases. Alternatively, any other image associated with allowance or discretionary spending, such as an open wallet, purse, etc., may be used to represent such expenditures, as desired.

In the bottom row, right-most column, icon 465 shows a portion of a rising stock investment curve. This icon design may correspond, for instance, to expenditures made for investment purposes. Alternatively, any other image associated with investments, such as a diamond gem, a ticker tape machine, a stock certificate, etc., may be used to represent such expenditures, as desired.

Figure 19:
FIG. 19 is an enlarged view of another alternative embodiment of a printed icon array particularly suited for business use.

FIG. 19 shows an enlarged view of another alternative embodiment of a printed icon array having features of the present invention particularly suited for business use. The individual icons therein preferably represent the corresponding expenditure categories set forth in TABLE 1, below, with icon positions 1–28 indicated from left to right and top to bottom. Alternatively, those skilled in the art will readily appreciate that a variety of icon designs may be used to represent business expenditure categories, as desired.

TABLE 1

| ICON # | DESIGN | EXPENSE |
| --- | --- | --- |
| 1 | Dollar Bill | Net Payroll |
| 2 | Dome w/ Dollar Bill | Payroll Taxes |
| 3 | Boxes | Supplies |
| 4 | Hard Hat | Outside Services/ Contract Labor |
| 5 | Target | Client Costs |
| 6 | Megaphone | Advertising/Promotion |
| 7 | Auto | Vehicle Expense |
| 8 | Forklift | Equipment |
| 9 | Umbrella | Insurance |
| 10 | Brief Case | Professional Services |
| 11 | House | Dwelling Rent |
| 12 | Hammer | Repairs/Maintenance |
| 13 | Desk | Office Expense |
| 14 | Dome | Taxes |
| 15 | Airplane | Travel |
| 16 | Fork/Spoon | Meals/Entertainment |
| 17 | Telephone | Telephone |
| 18 | Electric Plug | Utilities |
| 19 | White Board | Professional Growth |
| 20 | Ampersand | Miscellaneous |
| 21 | Stock Chart | Investments/Assets |
| 22 | Bank | Debt/Mortgage |
| 23 | Bucket | Owner Draw |
| 24 | Recycle Sign | Reimbursables |
| 25 | NUMBER 1 | User Defined |
| 26 | NUMBER 2 | User Defined |
| 27 | NUMBER 3 | User Defined |
| 28 | NUMBER 4 | User Defined |

Although the particular icons shown in FIGS. 3, 18 and 19 are preferred for indicating household and business type expenditures, it will be readily appreciated by those skilled in the art that any number of various graphic icon designs may be used to represent the same or similar expenditure categories. In other words, icons and corresponding categories may be changed to accommodate the needs of particular bank customers. It is further envisioned that different sets of icons may be provided to meet the needs of different types of households. For instance, a dual income couple with no children may have different expenditure tracking requirements than a family of five, or a single person in college, for instance. In an alternative embodiment, checks are printed with custom icons selected by bank customers from a pre-determined list according to their own individual needs. In that case, a bank or processing center scanning the checks would preferably record selected icons and corresponding expenditure categories for each individual bank customer.

Figure 20:
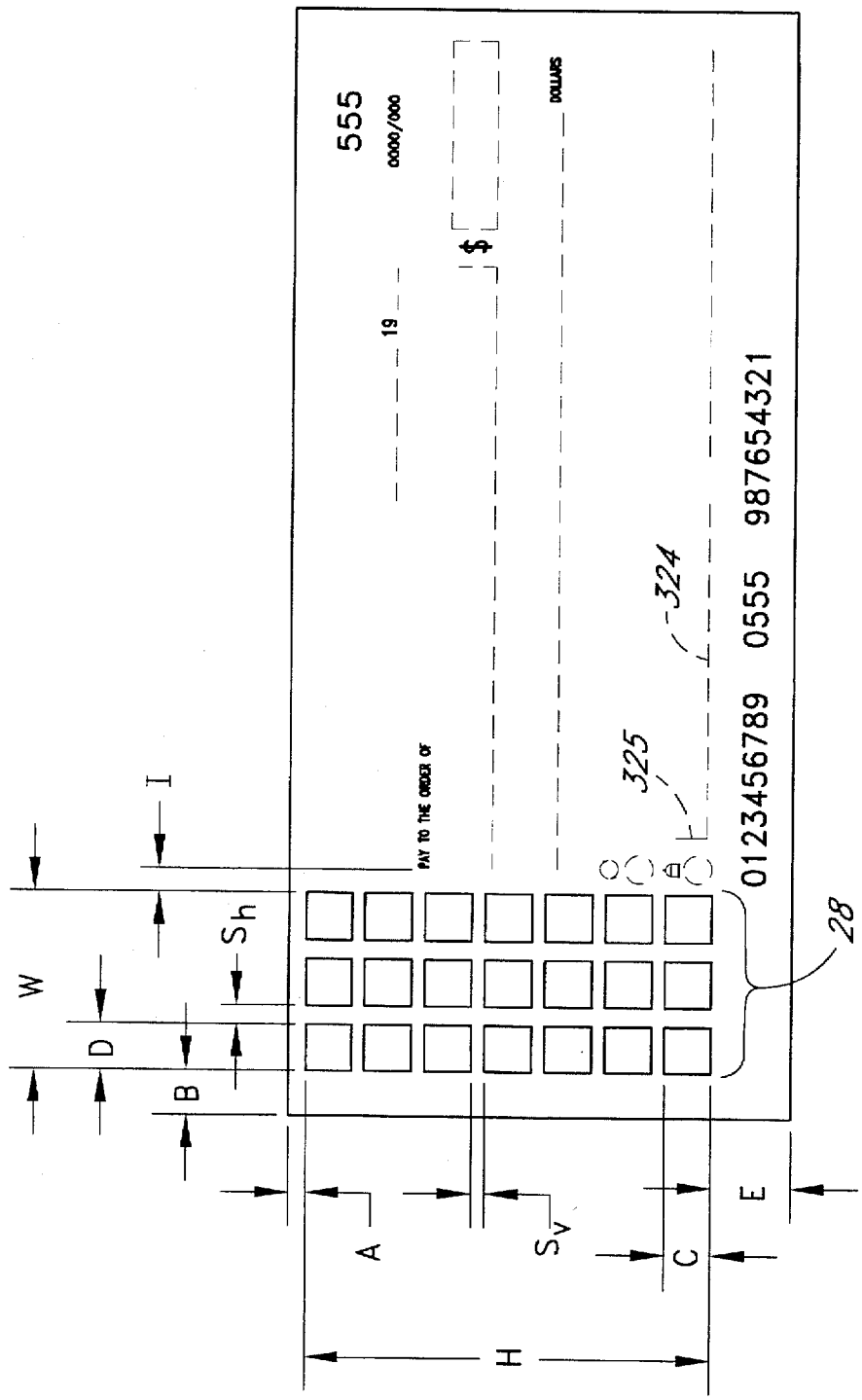
FIG. 20 is a detailed view of a personal-sized printed bank check having features in accordance with the present invention, showing the preferred location of the icon array.

FIG. 20 is a detailed view of a personal-sized printed bank check illustrating the preferred placement and dimensions of an icon array 28 relative to the borders of the check. These dimensions preferably conform to well-known industry standards for reader/sorter equipment such as the IBM 3890 XP (image enabled) or BTI 5500 reader/sorter. An icon array 28 for a conventional personal-sized bank check will have a preferred height "H" of up to about 2.1719 inches and a preferred width "W" of up to about 0.9358 inches, as illustrated in FIG. 20. The individual icons in the icon array 28 preferably measure up to about 0.25 inches×0.25 inches square (C and D) and are preferably separated by a clear space of between about 0.020 inches and 0.080 inches vertically ($S_v$) and between about 0.050 inches and 0.150 inches horizontally ($S_h$). More preferably, icon rows are separated by a vertical clear space $S_v$ of about 0.0703 inches and icon columns are separated by a horizontal clear space $S_h$ of about 0.0929 inches.

The icon array 28 is preferably spaced about 0.2483 inches (B) from the left edge of the bank check. Preferably the bottom row of icons is positioned about 0.4531 inches (E) from the bottom edge of the check, as shown. For a personal-sized bank check the icon array 28 is preferably spaced about 0.125 inches (A) from the top edge of the bank check. Preferably, a minimum space of about 0.150 inches (i) is provided between the icon array 28 and other writing zones on the check face.

Figure 21:
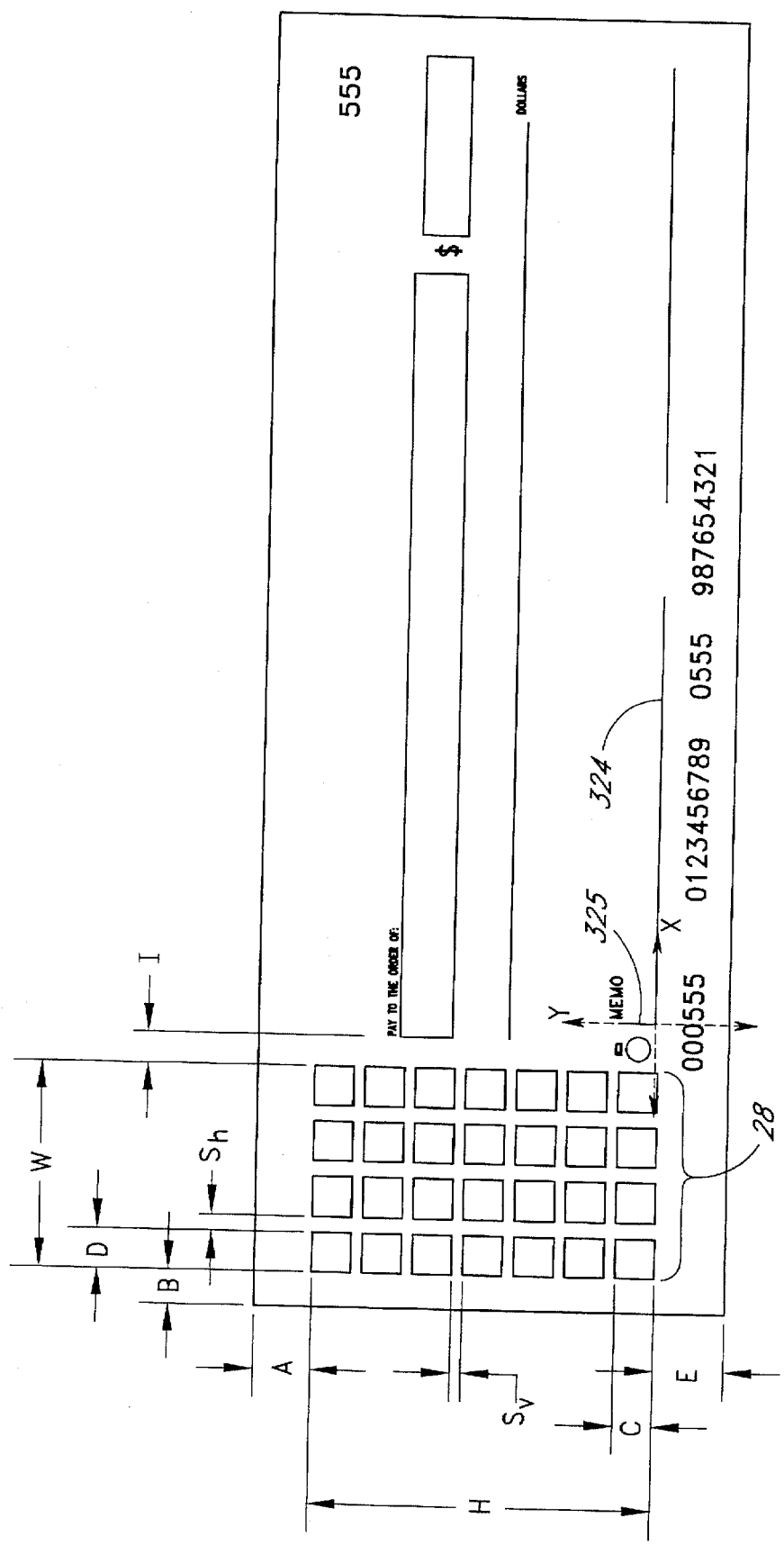
FIG. 21 is a detailed view of a business-sized printed bank check having features in accordance with the present invention, showing the preferred location of the icon array.

Business-sized bank checks may accommodate a larger icon array 28, as shown in FIG. 21. A typical icon array 28 for a business-sized bank check will have a preferred height "H" of up to about 2.1719 inches and a preferred width (W) of up to about 1.2786 inches, as illustrated in FIG. 21. In the preferred embodiment shown twenty-eight icons are arranged in four columns of seven rows each. The icon array 28 in FIG. 21 is preferably spaced about 0.3764 inches (A) from the top edge of the bank check. All other icon array dimensions are preferably the same as described above in connection with FIG. 20.

2. Printed Graphic icon

Preferably, the icons 45–65 shown in FIGS. 1 and 3, the icons 445–465 shown in FIG. 18 and the icons shown in FIG. 19 are printed using a novel technique that provides an icon having not only good image detail and aesthetic appeal, but also enhanced detectability of a mark made thereon by a bank customer. It will be further understood, that while the present invention is described in the context of a printed bank check, it is envisioned that icons constructed in accordance with the present invention may provide similar advantages and benefits in a wide variety of other applications, such as in public opinion polling, voting, surveys, standardized testing, etc.

Figure 4A:
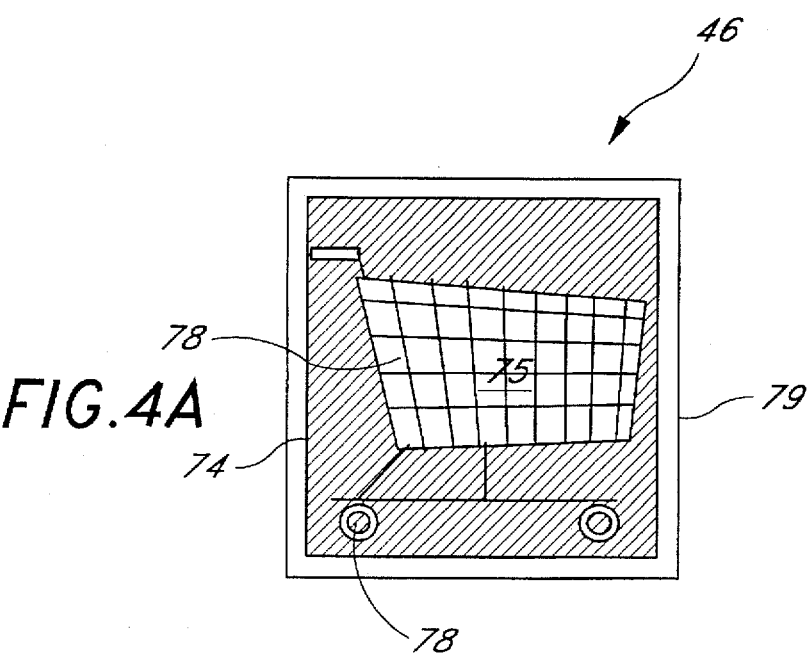
FIG. 4 is an enlarged view of one embodiment of a printed icon having features of the present invention.
Figure 4B:
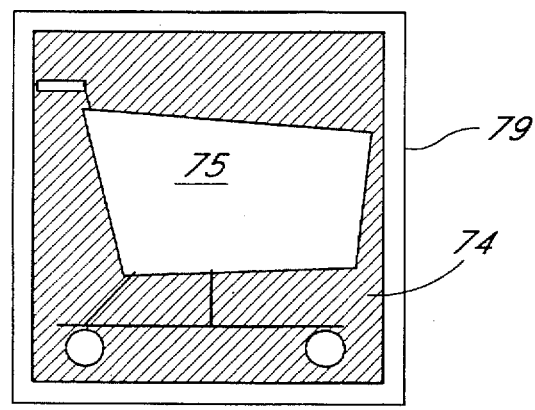
Figure 4C:
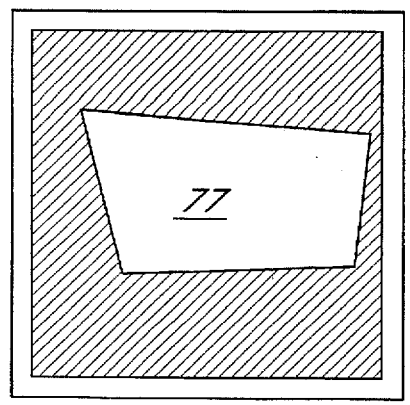

FIG. 4 is an enlarged view of a printed graphic icon having features of the present invention. The icon 46 generally comprises a relatively dark, preferably solid black, outer portion 74 and a relatively light inner portion 75, as shown in FIG. 4A. The dark outer portion 74 is preferably sufficiently dark such that its light absorptivity falls above a predetermined threshold level. The light inner portion 75 is preferably sufficiently light such that its light absorptivity falls below a predetermined threshold level. A mark is be detected by scanning the icon 46 and applying threshold imaging (described later) to obtain a bi-level pixel image thereof, as illustrated in FIG. 4B. Any mark made on the icon would then appear as dark pixels within a predetermined intended marking area 77. A substantially all white intended marking area 77, as shown in FIG. 4C, indicates that no mark has been detected.

The particular absorptivity levels selected for the light and dark portions of the icon will depend, among other things, on the sensitivity of a scanner used to scan the each icon, the aesthetic appearance of the icons, as well as the inherent limitations of the particular printing process selected. It will be appreciated that a higher absorptivity will produce a darker appearing icon. Lower absorptivity will produce a lighter appearing icon. For the light inner portion of the icon, an absorptivity of between about 0.10 and 0.50 and, more preferably, about 0.15, is preferred and provides a convenient compromise between the competing design objectives indicated above. The dark outer portion is preferably as dark as possible, having an absorptivity that is at least greater than about 0.75 and, more preferably, greater than about 0.90. Sufficient tolerance is preferably provided to accommodate for any possible variations in printing ink density, color, printing conditions, or the substrate itself. A tolerance level of about plus or minus 10% produces adequate results under most printing conditions. Alternatively, higher or lower absorptivity or tolerance levels may be used, as desired, while still enjoying the benefits of the present invention as disclosed herein.

It will be appreciated that providing an icon with light and dark portions, as described above, provides a high degree of user recognition and also dramatically enhances the detectability of a mark made within the defined marking area 77, as will be described in more detail later. It will be appreciated that user recognition of icons is critically important, particularly in cross-linguistic environments. Preferably the dark outer portion 74 of the icon 46 completely encloses and defines an inverted silhouette of the particular icon design, as shown in FIG. 4B, in this case a grocery cart. The intended marking area 77 is further defined within this inverted silhouette area, as shown in FIG. 4C, and preferably encompasses a relatively large, centrally disposed portion of the light inner portion 75 of the icon 46, as shown.

Image detailing, such as shadowing and highlighting 78, is preferably provided within the light inner portion 75 of the icon 46, as shown in FIG. 4A. These embellishments aesthetically enhance the icon and provide improved recognition of each particular icon design. Preferably, this image detailing 78 is printed using one or more light colored inks which are screened using a half-tone printing process or other means, as desired, such that the light absorptivity of the light inner portion 75 remains below the aforementioned threshold absorptivity level. This ensures that any such detailing 78 will "drop out" of a scanned pixel image of the icon 46 or may be filtered out or removed using threshold imaging, as will be described in more detail later.

Choice of color, use of dithering screens and very thin lines can all be used to decrease the light absorptivity of the detailing 78, as needed, to ensure that it consistently drops out of the scanned image. It is particularly convenient to use certain printing inks referred to in the printing trade as "spot" colors. These printing inks possess a quality whereby the shade and intensity of the color remain substantially constant from print run to print run. Using spot colors for the detailing 78 ensures that these embellishments will drop out consistently from one icon printing run to the next. For instance, a Kramer Process Blue ink screened with a density of between about 10% and 50% and, more preferably, between about 20% and 35% on a light colored substrate produces acceptable results for detailing 78. Alternatively, a wide variety of colors, screen densities and substrates may be used while still enjoying the benefits of the invention as herein disclosed.

It will be understood by those skilled in the art that conventional screening produces a printed image that is composed of a uniform array of small dots. For optimal results, it is preferred to arrange this array of dots in a slightly canted or non-uniform position with respect to a scanner used to scan the icon image. This ensures that uniform rows or columns of dots will not register simultaneously with the scanner's sensor array. Advantageously, this increases the probability that the detailing 78 will consistently drop out of a scanned image. Accordingly, the screen is preferably canted by between about 30 and 60 degrees and, more preferably, by about 45 degrees from horizontal. Alternatively, the detailing 78 may be screened such that the individual dots comprising the detailing 78 are arranged in a random or substantially non-uniform pattern, as desired.

The area ratio of light to dark portions of the icon 46 may be varied as desired, although a light/dark ratio of between about 2:1 and 1:2 and, more preferably, about 1:1 is preferred for most icon designs. It will be understood that for a 1:1 light/dark ratio, about 50% of the icon will be comprised of light portions and about 50% of the icon will be comprised of dark portions. Alternatively, larger or smaller light/dark area ratios may be used, as desired, while still enjoying the benefits of the present invention. An optional black outer frame 79 may be provided around the periphery of the icon 46, as desired, in order to provide a defined area within which the graphic icon 46 is fully contained. This frame 79 and the white space on either side of the frame 79 provides a convenient reference for locating, scaling and aligning icons, as will be described in more detail later.

Figure 5A:
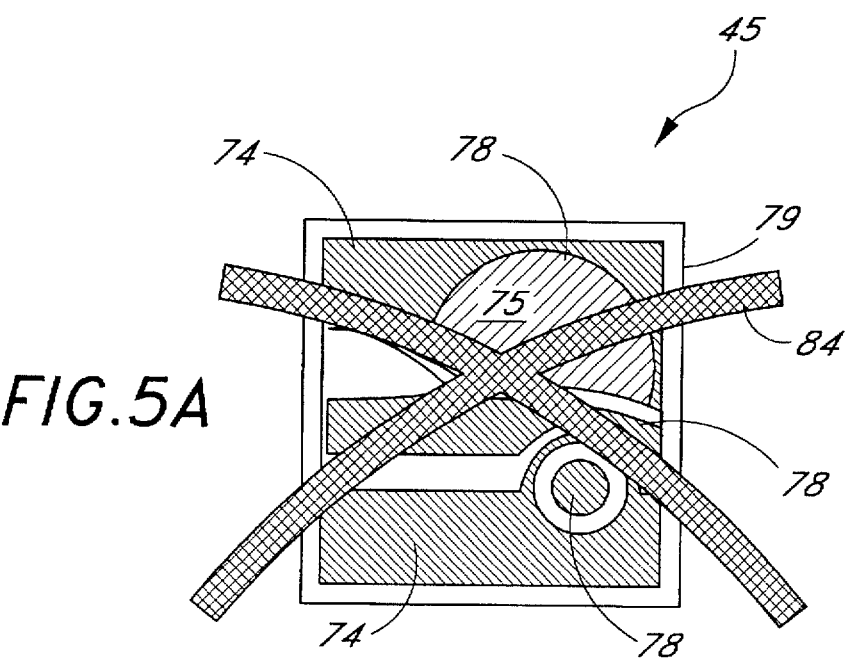
FIG. 5 is an enlarged view of an alternative embodiment of a printed icon having features of the present invention, illustrating in more detail how the icon may be marked by a bank customer to indicate a selected expenditure category.
Figure 5B:
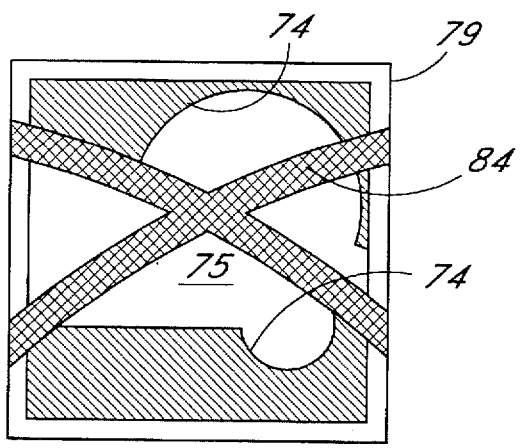

As mentioned above, a mark placed on an icon in accordance with the present invention is detected by scanning the icon 46 and then applying threshold imaging to obtain a bi-level pixel image of the icon, as shown in FIGS. 5A and 5B. Threshold imaging is a well known image processing technique that basically converts a pixel image in the form of a plurality of analog or digital readings of light absorptivity or reflectivity, into a bi-level pixel image in which individual pixels are either black ("1") or white ("0"). Black is arbitrarily defined as a light absorptivity reading above a predetermined threshold level, and white is arbitrarily defined as a light absorptivity reading below a predetermined threshold level. It will be appreciated that "absorptivity" is simply another way to describe the light reflectivity of a particular substrate surface at a desired wavelength. Either term may be used to describe measured light reflectance, but absorptivity will be used here for convenience in later discussions. Light absorptivity readings falling above the black/white threshold appear as black pixels. Absorptivity readings falling below this threshold level appear as white pixels.

Threshold imaging may occur in the scanner itself, such as in a bi-level image scanner, for instance. In that case, the black/white threshold corresponds to the inherent threshold detection level of the scanner for discerning black from white. This may be adjustable, depending upon the particular scanner. Preferably, however, a grey-scale scanner is used to capture the icon image in various shades of black, white and grey. Threshold imaging is then applied in a separate computer imaging system or other image processing device in order to obtain a black and white bi-level pixel image suitable for detecting marks made on the icon. Advantageously, in that case the black/white transition or threshold detection level may be conveniently calibrated in the computer imaging system software or programming, again, depending upon the particular device.

Preferably icons in accordance with the present invention are adapted to be scanned using a drop-out blue scanner. Alternatively, other wavelengths of light or non-visible radiation may be used, as desired, to achieve the benefits of the present invention as taught herein. For instance, it may be desirable in certain applications to use near-visible infrared, ultra-violet or broad-band visible light. In that case, the absorptivity of light and dark portions of the icon will be selected having reference to those particular wavelengths. Optionally, any number or combination of colored filters may be used for icon scanning, as desired, to achieve a particular desired result or effect as taught herein.

FIG. 5 is an enlarged view of an alternative embodiment of an icon printed in accordance with the present invention, illustrating how the icon may be marked by a user. Like numbers are intended to correspond to like characteristics or features of the icon, although the particular shape or form of the icon 45 may be different, as shown. The mark 84 is a typical type of mark which may be placed on an icon constructed in accordance with the present invention. It is an "X" located mostly within the outer icon frame 79, but perhaps partially extending out of the frame, as shown. It may be seen that the center of the mark 84 is located approximately within the intended marking area 77, which in this case, roughly corresponds to the shape of the inverted silhouette formed by the dark outer portion 74. It may be appreciated that the mark 84 produces a relatively low contrast with the dark outer portion 74 of the icon 45 and a relatively high contrast with the light inner portion 75, including detailing 78, as illustrated in FIG. 5A. Advantageously, this dramatically enhances the detectability of the mark 84 within the marking area 77, as will be explained.

The mark 84 is detected by electronically masking the dark outer portions 74 of the bi-level image shown in FIG. 5B with a template or mask 86 that has an open area (within the dashed lines) corresponding roughly to the size and shape of the intended marking area 77. Preferably, this is done electronically in a computer imaging processing system, as will be explained in more detail later. Preferably, the open area of the mask 86 is somewhat smaller than the corresponding intended marking area 77 so that a degree of image tolerance is thereby provided for slight variances and misalignment of the mask 86 and the icon 45. Image tolerance may be provided uniformly around the open area of the mask 86, substantially as shown or, more preferably, the mask is adjusted by trial and error testing so as to provide larger tolerances in certain "problem" areas and smaller tolerances in other areas. Advantageously, this maximizes the size of the mask within the intended marking area in order to provide optimal dynamic range of mark detection. Alternatively, it will be readily apparent to those skilled in the art that a variety of mask shapes and sizes may be used, as desired, while still enjoying the benefits of the present invention as herein disclosed.

It will be appreciated that once the known dark portions of the icon 45 have been masked out, all that remains of the original icon image are the white pixels corresponding to the light inner portion 75 of the icon. Any remaining contiguous dark pixels within the open area of the mask 86 are then counted and compared to a predetermined threshold number to determine whether a mark has been detected. Preferably, filtering is used to remove spurious "noise" in the pixel image before mark detection is attempted. This noise may appear, for instance, as specks or dots in the pixel image.

Figure 22A:
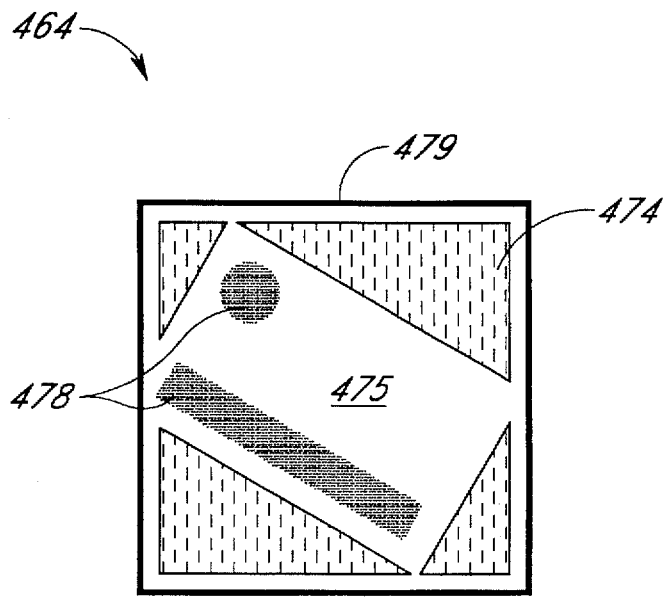
FIG. 22 is an enlarged view of an alternative embodiment of a printed graphic icon having features in accordance with the present invention, showing how the icon appears to the human eye (FIG. 22A) and to a bi-level scanner (FIG. 22B)

FIG. 22 is an enlarged view of another alternative embodiment of a graphic icon having features of the present invention. The icon 464 generally comprises an outer portion 74 defining an inverted silhouette of a desired icon design, in this case a credit card having a magnetic strip. The outer icon portion 474 is preferably printed in a solid color using a suitable drop-out ink, as will be described in more detail below. An inner icon portion 475 is provided within the silhouette area defined by the outer icon portion 474. Various graphic details 478 are providing within the inner icon portion 475, as shown, further defining the icon design and enhancing human recognition thereof. The graphic details 478 are preferably also printed in drop-out ink using any one of a number of well-known half-tone screening techniques such that they appear lighter than the outer icon portion 474. The resulting icon 464 has an overall aesthetically pleasing appearance, enhanced user recognition of the icon design and improved machine detection of marks made thereon.

The light inner icon portion 475 also provides a target marking area for providing maximum contrast with a mark made thereon by a user so that the user can readily see when the icon has been adequately marked. Preferably, the inner icon portion 475 has only minimal or no shading 478 such that the open area therein is as large as possible for enhancing mark contrast and improving user recognition thereof. Preferably, less than about 25% and, more preferably, less than about 10% of the inner icon area 475 comprises shading 478. A thin, black frame 479 may be provided around the outer icon portion 474, as shown, to further define the intended marking area. The frame 479 preferably measures about 0.25 inches×0.25 inches square and is at least 0.7 points (0.0097") thick. As indicated above, the entire icon 464 (with the exception of the optional black outer frame 479) is printed using a suitable drop-out ink. Preferably, a suitable drop-out ink has a spectral absorptivity or "print contrast signal" ("PCS") of about 0.40 or less. PCS can be measured on well-known commercially available test equipment equipped with a filter having a peak spectral response at 5550 angsttoms (555 nanometers) and a one-half peak spectral response at 5100 to 6100 angstroms (510 to 610) nanometers.

A wide variety of suitable drop-out inks may be used to practice the present invention, as shown in TABLE 2 below.

TABLE 2

| Color Desc. | Modifier | Name/Pantone No. | PCS < .15 | PCS < .25 |
|---|---|---|---|---|
| Yellow | Basic | Yellow, .012 | X | |
| | Process | Yellow | X | |
| | | 100–102, 106–109, 113–115 | X | |
| | | 120–123, 1205–1225, 127–129 | | X |
| Yellow-Orange | | 116, 130, 136, 1365 | | X |
| Orange | Basic | 021 | | X |
| Red | Basic | 032 | | X |
| | Basic | Warm Red | X | |
| Beige-Orange | | 141, 148, 1485, 1495 | X | |
| | | 142, 149, 1505 | | X |
| Beige-Red | | 155, 156, 1555–1575 | X | |
| | | 157, 158, 1585 | | X |
| Red | | 162, 163, 1625, 1635, 169, 170 | X | |
| | | 176, 177, 1765, 1775, 1767 | X | |
| Red-Pink | | 182, 189, 1895, 196, 203, 217 | X | |
| | | 183, 190, 1905, 197, 210, 223 | | X |
| Purple | | 230, 2365, 243, 250 | X | |
| | | 231, 236, 251 | | X |
| Violet-Blue | | 2706 | | X |
| Green | | 379, 386, 387 | X | |
| | | 380, 388 | | X |

TABLE 2-continued

| Color Desc. | Modifier | Name/Pantone No. | PCS < .15 | PCS < .25 |
|---|---|---|---|---|
| Green-Yellow | | 393, 394, 395, 3935, 3945, 3955 | X | |
| Beige-Brown | | 461 | X | |
| | | 460 | | X |
| Florescent | Grn, Yel, Org, Red | 802–806, 810–812 | X | |

These colored inks are available from any number of well-known large commercial printing supply companies. The preferred range of colors or combinations of colors for providing both drop-out capability and good aesthetic contrast will have a PCS of between about 0.05 and 0.25. The more preferred range providing the most contrast to the human eye and yet retaining a drop-out capability will fall between the PCS scale from about 0.15 to 0.25. These preferred colors are indicated in TABLE 3 below:

TABLE 3

| Color | Pantone Number |
|---|---|
| Beige-Orange | 142, 149, 1505 |
| Beige-Red | 157, 158, 1585 |
| Red | 164, 1645, 178, 1785, 1767 |
| Red-Pink | 183, 190, 1905, 197, 210, 223 |
| Purple | 231, 236, 251 |
| Violet-Blue | 2706 |
| Green | 380, 388 |
| Beige-Brown | 460 |
| Fluorescent | 802–806, 810–812 |

The most preferred color is Purple Pantone #251. This color has a PCS of 0.23 and provides optimal contrast and aesthetic appeal for most applications.

Figure 22B:
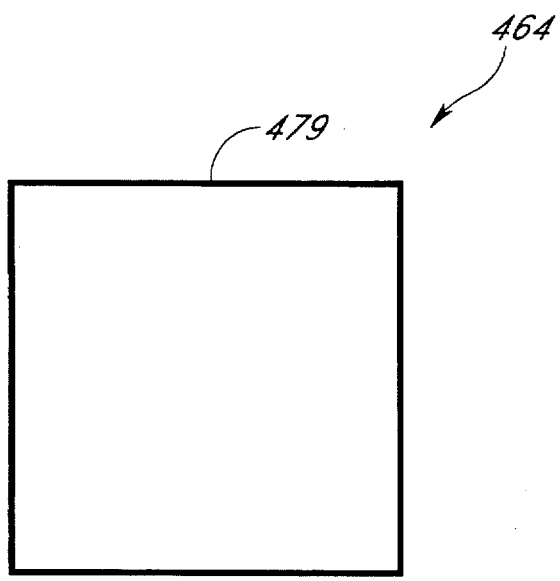
Figure 23A:
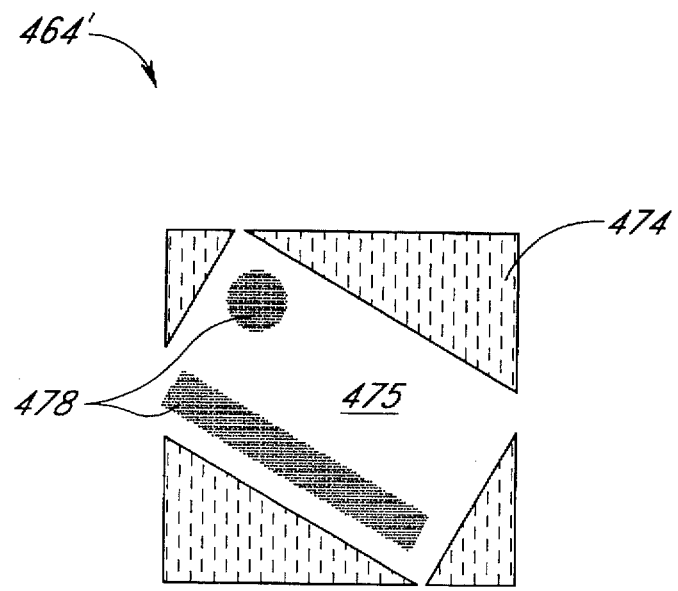
FIG. 23 is an enlarged view of another alternative embodiment of a printed graphic icon having features in accordance with the present invention, showing how the icon appears to the human eye (FIG. 23A) and to a bi-level scanner (FIG. 23B)
Figure 23B:
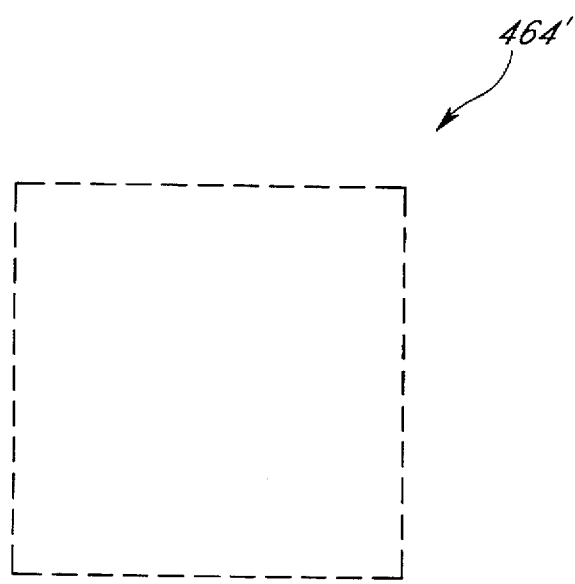

As indicated above, the outer icon portion 474 and the inner icon portion 475 are preferably printed using a drop-out ink having a PCS of less than about 0.4. FIG. 22B illustrates how the icon 464 appears to a scanner having a threshold PCS detection level above about 0.40. As shown, the entire icon 464 (with the exception of the outer frame 479) is invisible to the scanner. Any marks made on the icon 464 will readily appear in a bi-level pixel image of the icon 464 as dark contiguous pixels disposed within the dark outer frame 479. Those skilled in the art will readily appreciate that a pixel image of an array of such icons 464, reproduced on a bank statement for example, will reveal the relative positions of each icon by the outer frame 479 so that a bank customer can visually identify any marks made thereon. Alternatively, the black outer frame 479 may be omitted, as illustrated in FIG. 23A, such that the entire icon 464' will be invisible to a scanner as illustrated in FIG. 23B.

Having thus described a printed bank check and graphic icon in accordance with the present invention, attention will now be directed to a preferred method and apparatus in accordance with the present invention for automatically tracking check expenditures using the above-described printed bank checks and graphic icons.

3. Expenditure Tracking System and Method

In accordance with one preferred embodiment of an expenditure tracking system and method of the present invention, checks are sorted and processed electronically using a scanner and computer imaging system capable of discerning which of a plurality of icons have been marked by a customer. A computer software routine is implemented by the computer imaging system or other computer image processor to detect particular marked icon(s). Marked icon (s) are then translated into corresponding expenditure categories which are stored in a transaction record in association with other information representative of each check transaction.

Figure 6:
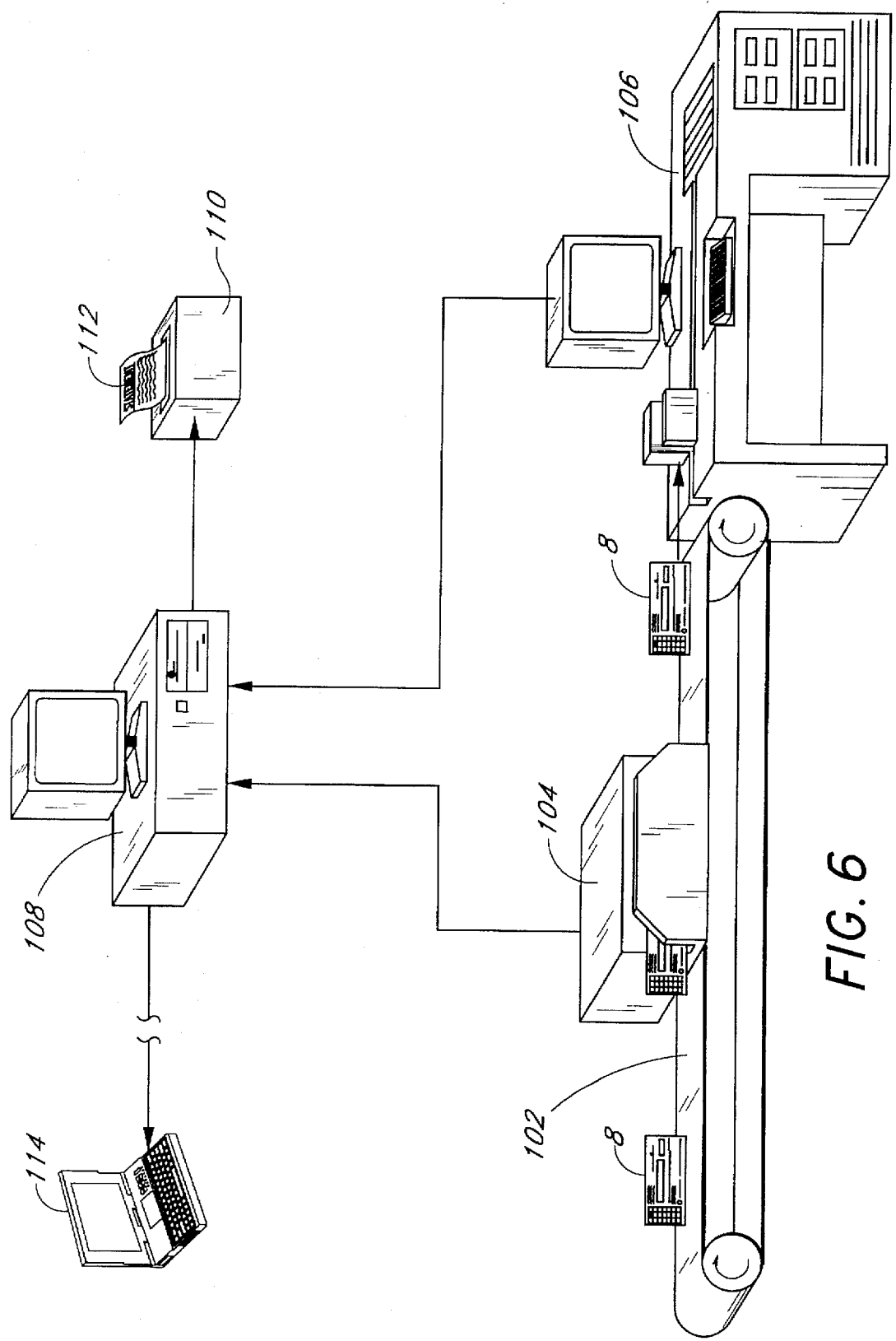
FIG. 6 is a schematic diagram of an automated check expenditure tracking system having features of the present invention.

FIG. 6 is a schematic illustration of one embodiment of an expenditure tracking system in accordance with the present invention. The expenditure tracking system comprises a MICR decoder 104, a scanner 106, and a central processor 108. A printer 110 or other output means may be provided, as desired, but is not necessary to practice the invention herein disclosed.

Bank checks 8 are drawn via conventional high-speed check handling equipment shown here schematically as comprising conveyor belt 102, through a MICR decoder 104 and a scanner 106. For continuous operation, checks are fed through the expenditure tracking system on a substantially continuous basis as they come in. More preferably, however, the system is operated in a batch mode whereby stacks of checks are inserted into the machinery, shown, and processed in a batch mode with a transaction record being generated and stored for each batch run.

Preferably, the MICR decoder 104 and scanner 106 are adapted to decode and scan bank checks while they are fed through horizontally on edge, as shown. Commercially available MICR decoders and scanners are capable of handling up to 60,000 checks per hour, depending upon the particular machine and the complexity of the check image to be scanned. A DEC Kiensel combination scanner and computer imaging system, available from Digital Equipment Corporation, for instance, provides a convenient scanner 106. A variety of other high-speed scanners are commercially available from such manufacturers as NCR, Kodak and Unisys, and may be used, as desired, to practice the present invention. Alternatively, it will be appreciated that, depending upon the speed and volume of throughput of checks processed by the expenditure tracking system, higher or lower speed components may be used, as desired, while still enjoying the benefits of the present invention.

The MICR decoder 104 is preferably of a type that is commonly available in the banking industry for decoding MICR code and electronically conveying information representative of the MICR code to an associated computer or other peripheral device. Although shown here separately for illustrative purposes, the MICR decoder 104 more preferably comprises a magnetic reading head or module that is incorporated into a single integral structure with the image scanner 106. Preferably this comprises an NCR 7780 High-Speed Power Encoder fitted with a MICR Reader Module, available from NCR Corporation.

The central processor 108 preferably comprises a high-speed computer having at least a 66 MHz 486 microprocessor, 16 MB of working RAM, 2 GB of fixed disk or magnetic tape storage and an image capable high-resolution, high-refresh monochrome monitor. Alternatively, the central processor 108 may comprise any computer imaging system or other computer image processor capable of receiving and processing pixel images and other information at high rates of speed. It will be further appreciated that such image processing may either be done on-line or off-line, depending upon the relative speed of the central processor 108 compared to the speed of the MICR decoder 104 and scanner 106.

In operation, the MICR decoder 104 reads the magnetic encoded numbers on the bottom of each check 8 and transmits this information to the central processor 108. The scanner 106 then scans the front and, preferably, the back of each check 8 in substantially rapid succession and transmits a pixel image thereof to the central processor 108. A pixel image having dimensions 825 pixels high by 1800 pixels wide, corresponding to a 300 dpi scan, provides a convenient size for purposes of expenditure tracking using printed bank checks having graphic icons in accordance with the present invention. Alternatively, other scan resolutions or pixel image sizes may be used, as desired, while still enjoying the benefits of the present invention. It is important, however, that the scan resolution and pixel image size be at least minimally sufficient to allow recognition of a mark made on the check by a writing instrument such as a ball-point pen.

The pixel image of each check 8 is then analyzed in the central processor 108 to determine which, if any, of a plurality of graphic icons have been marked. It will be understood that these pixel images need not be actually displayed, but may be stored in working memory and manipulated in accordance with well known pixel imaging techniques. Once selected expenditure categories have been determined, this information is then combined with other transaction information, such as the dollar amount of the check, check transaction number, bank account number, bank routing number, and payee name, in order to generate an expenditure statement 112 which may be provided to the bank customer, as desired. Alternatively, this information may be electronically downloaded, as desired, via modem or other means to a home or business computer 114, as shown.

FIG. 7 is a front view of one possible embodiment of an expenditure statement 112 in accordance with the present invention. The statement 112 contains customary information such as the account number and bank customer name at the top, as shown. Expenditures are then broken down by category, such as auto expenses, groceries, etc., as shown. Within each category are listed corresponding check transaction numbers 113, obtained, for instance, from the MICR code. Next to each check transaction number 113 is provided a printed image of the payee name 114, obtained from the check image, and the amount of the check 115, as determined from the MICR code. Optionally, this check amount may be verified against the amount written in the check amount box using a modified OCR technique described in more detail later.

Advantageously, image capturing and reproducing of the payee box 16 provides a convenient way of reporting each check transaction to a bank customer without having to return or provide copies of individual checks. Furthermore, it provides additional security by affording the bank customer an opportunity to identify and verify the payee name and thereby determine if the check had been fraudulently written or obtained. Alternatively, one or more optical character recognition ("OCR") techniques may be used to convert a handwritten or typed payee name in the payee box 16 into ASCII equivalent characters that can be similarly reproduced in an expenditure statement or other accounting statement provided to the bank customer. Image capturing and reproducing of the text image within the payee box 16 is preferred, however, due to the current difficulties of primary recognition of handwriting using presently available OCR techniques and the aforementioned benefits of reproducing the actual payee box 16 on the expenditure statement 112.

The above described expenditure statement is convenient for monitoring monthly expenditures in each of a plurality of expenditure categories. Alternatively, a wide variety of different types of expenditure statements may be generated, as desired, such as a year-to-date statement or an assets-and-income statement, etc. Expenditure information may also be organized into a pie chart or other similar graphic form in order to visually illustrate a particular breakdown of expenditures, as desired. Alternatively, it will be readily apparent to those skilled in the art that various graphs, tables and statement forms may be provided to convey expenditure tracking information to a customer in a convenient and useful way.

In a particularly preferred embodiment, such expenditure tracking information is incorporated into a conventional bank statement to provide a more detailed and useful analysis of account deposits and withdrawals. Most preferably, such a statement would be an all-encompassing statement of expenditures, deposits, account balance, interest earned, ATM, POS, and EFT withdrawals and transactions, etc. This format is particularly desirable for banks that wish to offer such premium services as part of a preferred customer program or other incentive program intended to attract and keep bank customers. Alternatively, it is envisioned that such statements may become standard in the banking industry as customers continue to demand more detailed and useful account information from their banking institutions.

Figure 8:
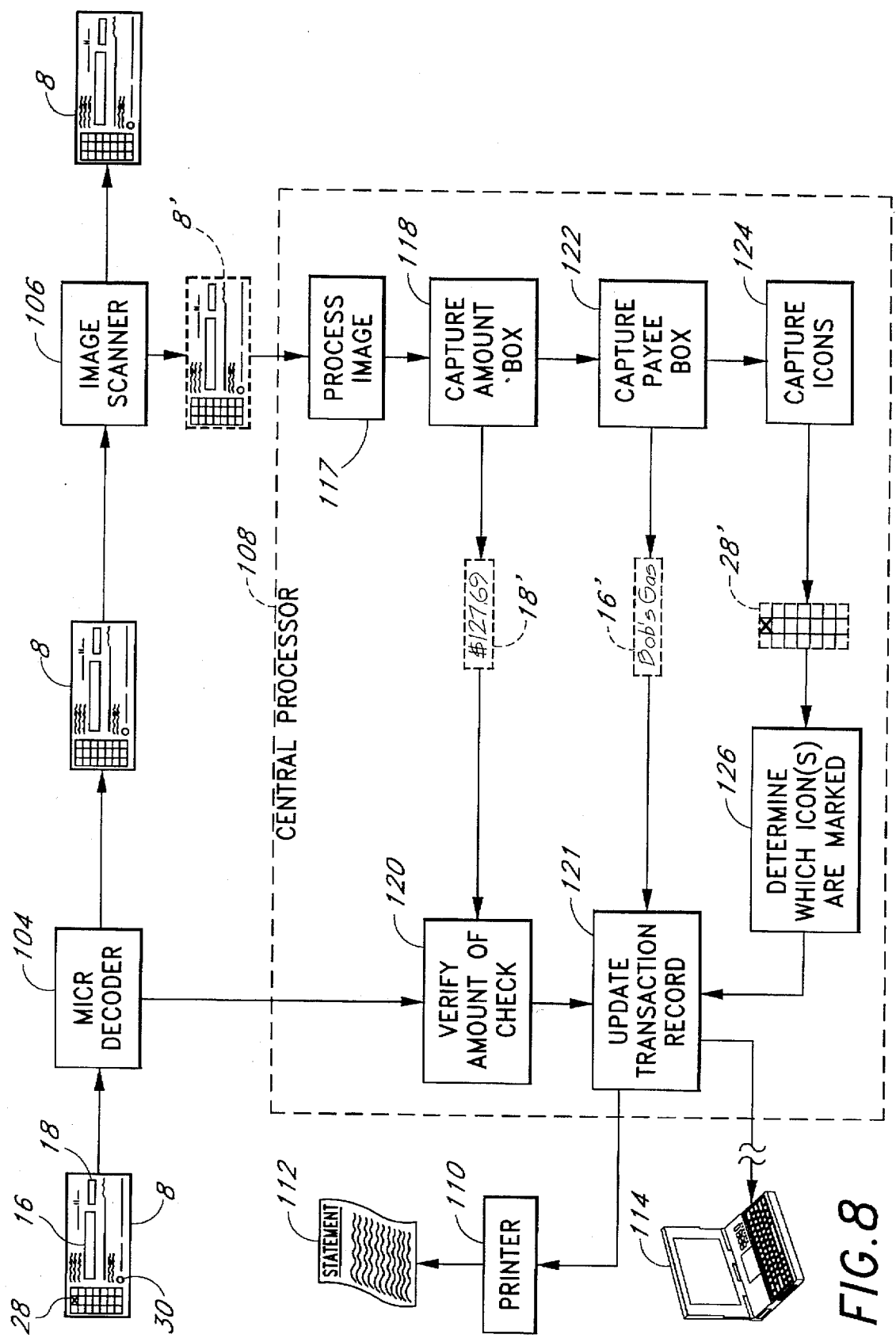
FIG. 8 is a more detailed schematic diagram of the check expenditure tracking system of FIG. 6.

FIG. 8 is a more detailed schematic block diagram of an expenditure tracking system having features of the present invention. In operation, bank checks 8 are sent through the MICR decoder 104 and the scanner 106. The order in which the check 8 enters the decoder 104 and the image scanner 106 is relatively unimportant; however, for convenience it is preferred that the MICR decoder 104 reads the check first so that the MICR code may be used thereafter as a reference number for subsequent processing steps. The MICR decoder 104 transmits to the central processor 108 an electronic signal which corresponds to the MICR code recorded on the bottom of the check 8. The scanner 106 is adapted to scan the check 8 at high speeds and produce an image thereof 8' which is also provided to the central processor 108. The scanner 106 is preferably adapted to produce a 16 level grey-scale pixel image of each check. Alternatively, the scanner 106 may be adapted to provide a bi-level image of each check, as desired.

The central processor 108 receives a series of binary data from the scanner 106 representative of a pixel image 8' of each check. This is preferably in the form of a TIFF file or other standard pixel image format, such as an ASCII file with commas delimited zones. A computer subroutine 117 processes this image by applying threshold imaging, aligning the image and correcting for minor distortions. Another subroutine 118 captures the pixel image of the amount box 18'. Subroutine 120 verifies that the amount written in the amount box 18' corresponds to the amount read from the MICR code by the decoder 104. This may be done using a secondary OCR recognition technique, which will be described in more detail later. A second image capture subroutine 122 captures a pixel image of the payee box 16', as shown. This is recorded in pixel form in the transaction record by the transaction update subroutine 121. A third image capture subroutine 124 captures the icon array 28', as shown, as well as any optional icon boxes (not shown). A novel mark detection subroutine 126 then determines which icons (if any) have been marked and provides this information to the transaction update subroutine 121. The transaction record is thereby updated accordingly, with the check amount, payee, and expenditure category as described herein.

Periodically, the central processor 108 may be prompted to provide a cumulative download of certain transactions recorded in the transaction record. This may be provided, for instance, to a printer 110 in order to generate a periodic expenditure statement 112, as desired. Alternatively, this information may be downloaded directly to a bank customer's home or business computer 114, as shown.

Figure 9:
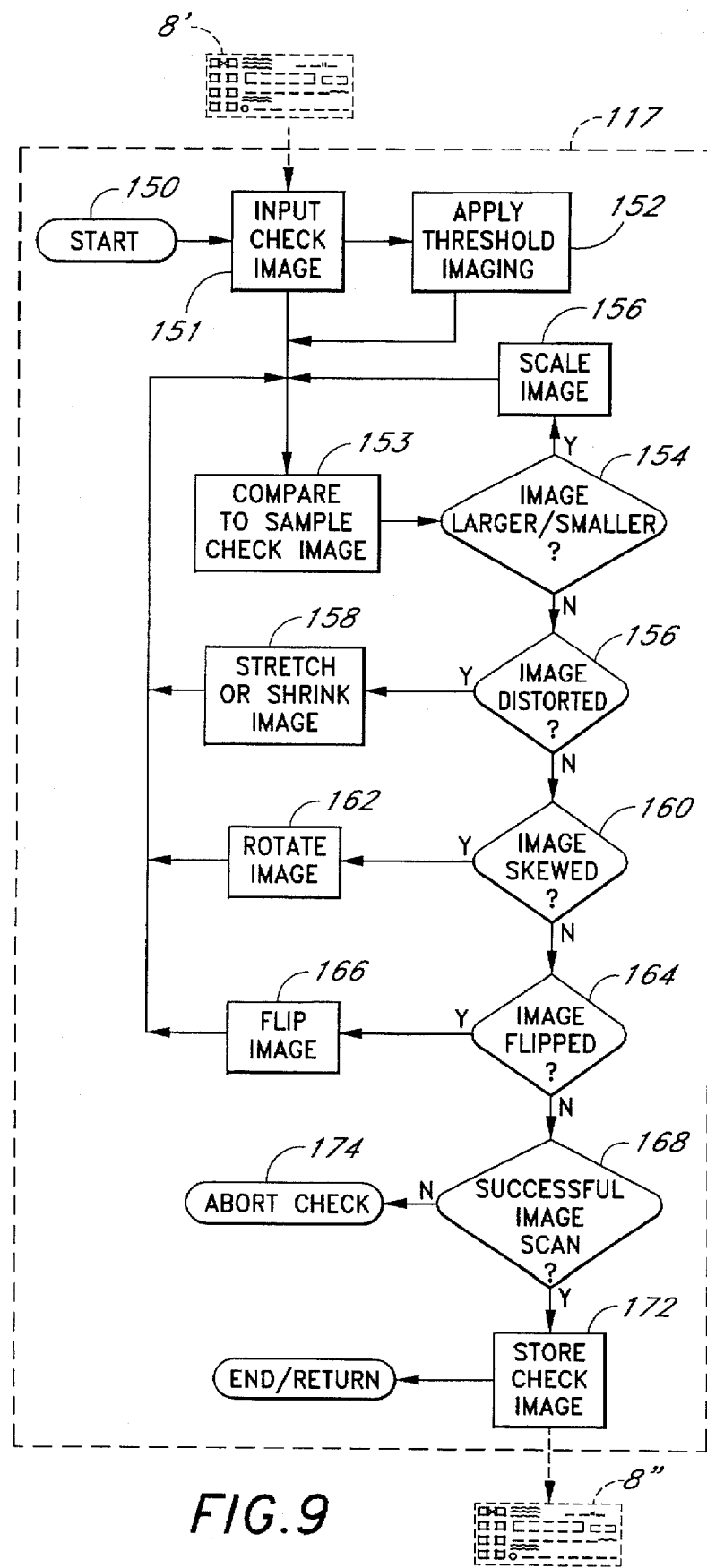
FIG. 9 is a more detailed schematic diagram of the image processing sub-routine 117 of FIG. 8.

FIG. 9 is a more detailed flow chart of the image processing subroutine 117 shown in FIG. 8. This is preferably in the form of a computer software subroutine or other electronic circuitry that may be called on demand to perform the steps described. The subroutine 117 begins at step 150 with the routine initialization of variables, defining common variables, allocation of working memory space, etc. Step 151 inputs the pixel check image 8' from the scanner 106 (shown in FIG. 8) into working memory. Preferably, the check image 8' is stored in a commonly accessible memory location such that the image may be accessed by any subroutine or software called to operate or perform functions on the image. This may be, for instance, a specifically allocated portion of RAM memory associated with the central processor 108, itself, or in an external storage device, such as a hard disk or CD-ROM disk, as desired. The image 8' is stored in binary or hexadecimal form in a TIFF file or other pixel image format wherein each binary digit represents a particular pixel location of the image. Each image will occupy approximately 192 K of working memory.

The storage and accessing of pixel image information in working memory is well known to those skilled in the art. For instance, the pixel image may be stored in memory row-by-row, column-by-column, or any other convenient means for storing pixel images. Preferably it is stored row-by-row, starting with the pixel in the upper left most corner of the check image and proceeding to the right until the last pixel in each row is reached. An end-of-row code such as a "00" "FF" may be inserted into the series of binary data representative of the check image 8' to indicate the end of each pixel row. The data then continues with the left most pixel of the next row. The beginning and end of each pixel image stored in memory may be further defined by recording the first and last memory location occupied by the data representative of the image. Alternatively, consecutive images may be "stacked" separated by an appropriate hexadecimal code, as desired, indicating the beginning and end of each pixel image. In this manner, it will be appreciated that any number of pixel images may be stored as linear arrays of binary or hexadecimal data which can be stored and accessed serially in working memory or other storage media, as desired.

If the check image 8' is a grey-scale image then threshold imaging is applied at step 152 to convert the image to black and white. Threshold imaging may be done, for instance, by defining a desired threshold black/white level and then comparing each grey-scale pixel to this threshold level to determine whether it falls above or below the threshold level. This will likely be a trial and error process for each particular check design. In selecting an appropriate threshold level, it is desirable to ensure that the light inner portion of each icon consistently drops out of the scanned image. On the other hand, the threshold should not be set so high that marks made upon the bank check by a bank customer will tend to fall below the threshold and drop out. Preferably, the threshold level is set just above the level that will cause the light inner portion of each icon to consistently drop out. This provides optimal dynamic range of mark detection.

If checks are scanned using a 16 level grey-scale scanner, for instance, where 0=lightest and 15=darkest, a threshold level of between about 7 and 10 and, more preferably, about 9 provides a convenient threshold level for most scanning purposes. Pixels falling above this threshold level (corresponding to high absorptivity) are then designated as black pixels, or "1"s. Pixels falling below this threshold level are designated as white pixels, or "0"s. The resulting bi-level pixel image is stored in working memory or other convenient memory location, as desired, for further processing.

Once the check image 8' has been inputted into memory as a bi-level pixel image, it is compared at step 153 to a reference or sample check image that has also been stored in an accessible location in working memory. The images are first compared for size in step 154 using a combination of an edge detection and pixel counting techniques. The check image is initially processed by filtering out all areas but those showing the highest contrast. This will occur wherever a white pixel is next to a black pixel and indicates the presence of an "edge". Preferably, the check 8 in FIG. 8 has been scanned against a dark or black background by the image scanner 106, such that the edge of the check image 8' will show high contrast with the black background.

Once the outline of the check image 8' has been established, the approximate size of the check image is then determined by counting or estimating the number of pixels within the check outline. If this image is significantly larger or smaller than the corresponding sample check image then the check is either aborted or, optionally, the check image 8' may be scaled at step 156 using any one of a number of well known pixel image scaling techniques, such as those contained in Visionshape's AutoClass® software library, available from Visionshape of Orange, CA. If size correction is attempted, then the scaled image is again compared at step 153 to the sample check image. If the size of the image is now within predetermined tolerances, such as plus or minus 10%, then the subroutine 117 proceeds to the next step 156.

Step 156 determines whether the image is distorted either vertically or horizontally. Vertical distortion refers to a scaled check image that is either taller or shorter than the sample check image. Horizontal distortion refers to a scaled check image that is longer or shorter horizontally than the stored check image. Either one of these types of distortions may occur in a high speed scanner using raster or linear array scan input. Distortion may be caused, for instance, by variations in the speed of the check going past a linear CCD scanner, causing the image to either be stretched or compacted. If the checks are fed horizontally, then horizontal distortion is more likely. If the checks are fed vertically, then vertical distortion is more likely. It is desirable to keep such speed fluctuations and distortions to a minimum. Alternatively, a photographic-type image-capturing device may be used, as desired, to take a substantially instantaneous "snap shot" of the entire check image. In that case, it will be appreciated that the likelihood of image distortion is substantially reduced. Either type of scanner may be used depending upon cost and availability.

If significant image distortion is detected, then the check is aborted. Optionally, step 158 may be provided in order to attempt to correct this distortion by either stretching or shrinking the check image 8' either vertically or horizontally, as the case may be. This may be done using any one of several well known pixel image scaling techniques, such as contained in the aforementioned Visionshape AutoClass® software library. If distortion correction is attempted, then the check image 8' is again compared to the sample image in step 152 and readjusted, as desired, until it is within predetermined tolerances, such as plus or minus 10%.

Once the size and distortion variations have been checked, the next step 160 is to check for image skew. This may occur, for instance, if a check is not lying flat on one edge as it is drawn past the image scanner 106 shown in FIG. 8. This may cause the resulting check image 8' to be angled or rotated from its normal horizontal position image skew is detected using a line detection technique, such as available from Visionshape's Autoclass Library, whereby known vertical and horizontal lines on the check image 8' are detected and then analyzed to determined if they are skewed. Degree of skew is preferably determined according to the average of all detected lines.

If significant image skew is detected, the check may either be aborted or, preferably, step 162 attempts to remedy this skew by rotating the image 8'. This may be done using any one of several well known pixel image rotation algorithms, such as is contained in the aforementioned Visionshape AutoClass® software library. Preferably, image rotation is incremented in accordance with the direction and angular degree of skew detected. Several rotations may be necessary before the image is within acceptable skew tolerances, such as, for instance, plus or minus 3 degrees rotation.

Step 164 verifies that the correct side of the bank check has been scanned or, in other words, that the check 8 has not been flipped front-to-back in the image scanner 106. This is preferably accomplished using a pixel image overlay technique whereby a sample check image is combined or merged with the check image 8' using an appropriate Boolean operator, such as AND, NAND or XOR (exclusive OR), operating upon corresponding pixels. The resulting image roughly reflects the percentage overlap of individual pixels between the sample image and the check image 8'. A high percentage of pixel overlap would indicate a relatively high probability that the check images correspond such that the front of the check has probably been scanned. A low percentage of pixel overlap would indicate that the front of the check has probably not been adequately scanned or is otherwise non-recognizable. Of course, it is possible that heavily canceled or marked-up checks may result in poor correspondence even though the check has been properly scanned. These types of image defects will result in the check being aborted at steps 168 and 170, as indicated. Alternatively, a flipped check image may be detected using any one of several pixel image recognition or verification algorithms such as is contained in the aforementioned Visionshape AutoClass® software library.

If a flipped image is detected the next step 166 attempts to correct this by switching or flipping the image from back to front. If both sides of the check have been simultaneously scanned by the scanner 106, then the images are swapped electronically. If not, then mechanical means are provided for routing the check back through the image scanner so that the other side is presented for scanning.

Preferably, each of the image correcting loops 153–166 has an abort feature whereby the check is automatically aborted or the correction procedure is automatically terminated after a certain predetermined number of correction attempts have been made. The threshold for aborting may vary from one correction step to the next. For instance, for the scaling of the image 154 it may be convenient to set an abort threshold of say 8–10 tries, whereas the flipped image 166 may have an abort threshold of only two tries since if neither side of the check produces correspondence with the sample check image then it is probably not possible to process it in the automated check expenditure system of the present invention.

In the event that a check is aborted, it is preferably forwarded to a manual inspection station or other auxiliary service station so that the system can proceed with other checks, the bulk of which will be able to be deciphered and processed automatically by the expenditure tracking system. If it is determined that a successful image scan has been obtained, then the corrected check image 8" is stored in memory as discussed above in connection with the step 151. This may be at the same memory location or a different memory location as the original check image 8', as desired, although preferably it is overwritten in the same memory location so as to conserve use of memory space. After the corrected check image 8" is stored in working memory, the subroutine 117 terminates at step 174 and command control is passed back to the central processor 108 for performing further processing upon the corrected check image 8", as will be described below.

Figure 10:
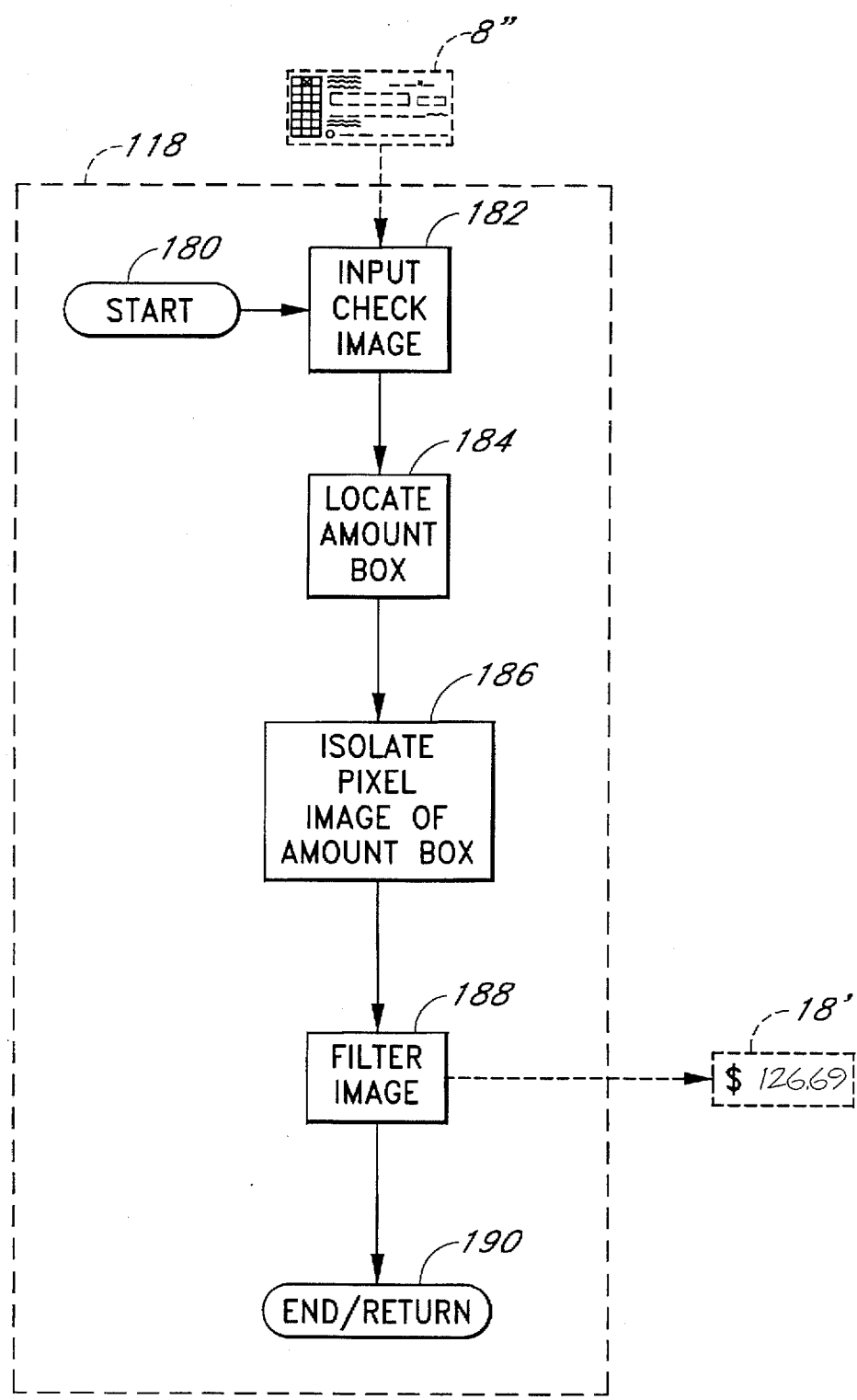
FIG. 10 is a more detailed schematic diagram of the check amount capture sub-routine 118 of FIG. 8.

FIG. 10 shows a more detailed flowchart diagram of the image capture subroutine 118 shown in FIG. 8. The subroutine is initialized at step 180. The corrected check image 8" is inputted from the preceding image processing step 117 shown in FIG. 8. Again, this inputting step is preferably accomplished by enabling access to a commonly accessible memory location where the corrected check image 8" is preferably stored. Once the corrected check image 8" has been inputted or access provided, step 184 locates the amount box 18' on the check image. This is preferably accomplished using a combination of edge detection and zone locating techniques. In this technique a zone is defined on the check image relative to known marks or lines on the check, itself. This corresponds to a defined area on the check within which the amount box 18' is expected to be found. The size of this zone is preferably at least slightly larger than the amount box 18' in order to accommodate for slight variations in the size and location of the amount box 18 occurring during previous scanning and image processing steps. A convenient zone size for the amount box is approximately 75 pixels vertically by approximately 330 pixels horizontally and corresponds roughly to the proportions of the amount box 18 shown in FIG. 1. Alternatively, larger or smaller zones may be used, as desired, depending upon the observed accuracy of the system in locating the amount box 18' for each particular check design.

The pixels in the locating zone are then examined using an edge detection technique in order to detect the outer borders of the amount box 18'. The amount box should be properly oriented at this point. Optionally, a further orientation or rotation step may be provided in order to prevent skew of the amount box 18'. Once edge detection has successfully located the amount box 18' within the locating zone, step 186 isolates the amount box image 18'. This will result in a somewhat smaller pixel image measuring approximately 75 pixels vertically by 300 pixels horizontally.

Once the pixel image 18' has been isolated, it is then filtered at step 188 using any one of several conventional pixel image filtering techniques, such as speckle removal, available from Visionshape's AutoClass® software library. In this technique, any individual pixels or small groups of pixels having no contiguous neighbors are reversed so that they will become contiguous with their neighbors. Thus, for instance, a small black spot appearing in an otherwise white zone would be replaced with a white spot so that a contiguous white image is presented. The same is true of white spots found in a black contiguous area. The number of pixels comprising an individual speckle may be varied as desired to provide a convenient level of filtering. If the speckle size is set to low, then not all the speckles in the image may be removed. On the other hand, if the speckle size is set to high, then potentially critical portions of the check image may be removed. Preferably, the speckle size for filtering is selected to correspond to at least a size smaller than a normal decimal point made by a ballpoint pen. The filtered image of the amount box 18' is outputted for further use by the central processor 108, as will be described below. The subroutine terminates at step 190 and command control is passed back to the central processor 108.

Figure 11:
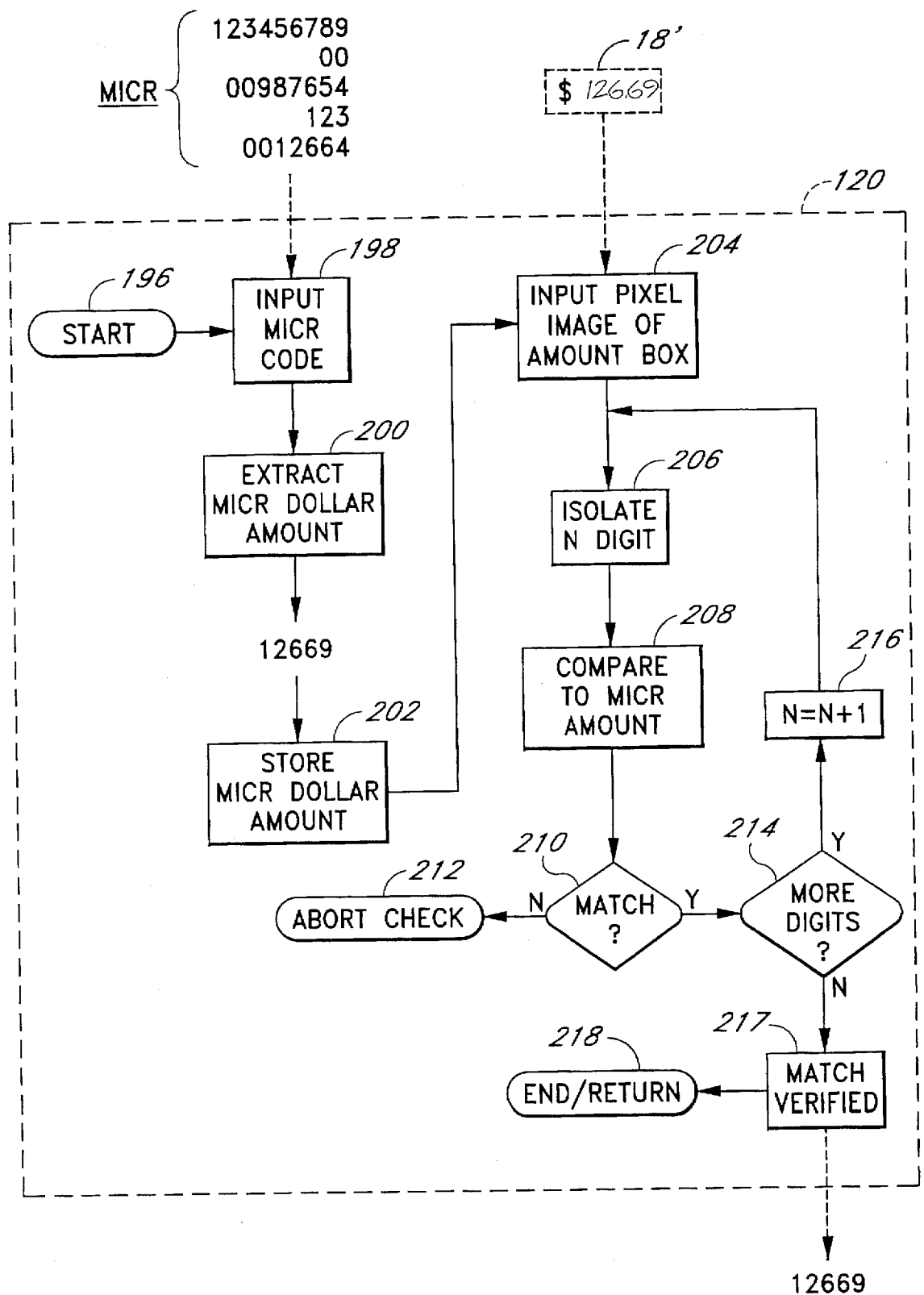
FIG. 11 is a more detailed schematic diagram of the amount verification sub-routine 120 of FIG. 8.

FIG. 11 is a further detailed flowchart diagram of the subroutine 120 shown in FIG. 8. This subroutine verifies that the amount indicated in the amount box 18 corresponds to the amount entered on the check in MICR code. The subroutine is initialized at step 196, as shown. The MICR code is inputted at step 198 and stored temporarily in working memory. Step 200 extracts from this MICR code the dollar amount of the check represented by the right most eight MICR digits on most checks. In this case, the MICR code indicates that the check is for $126.69. This dollar amount is stored in working memory at step 202, as shown.

Step 204 inputs the pixel image of the amount box 18' obtained from the subroutine 118, as previously described. Again, this is preferably inputted by enabling access to a common memory area containing binary data representative of the pixel image 18'. Beginning on one side of the image 18' step 206 isolates each digit in the pixel image 18' proceeding from right to left, in this case, beginning with the numeral "9". Alternatively, verification may proceed from left to right, as desired.

Digit isolation is accomplished using conventional image processing techniques such as have been described previously. Preferably, the image is divided into segments separated (if possible) by at least one vertical column of substantially contiguous white pixels. These white pixels represent a space between individual digits. The numeral "9", for instance, may be separated from the rest of the image by locating a vertical column of substantially contiguous pixels between the six and the nine so that the character nine can then be isolated and examined in more detail.

Each isolated digit is then verified using a conventional OCR software routine, such as is available from Visionshape's AutoClass® software library. OCR recognition is preferably secondary, however, in that the software is instructed to begin with the particular expected character, in this case the numeral "9". The OCR software then looks for and confirms the existence of several characteristic features of the particular isolated digit and generates a match percentage output representative of the percentage likelihood that the isolated digit is the expected digit. For example, for the numeral "9" the OCR software may look for a substantially vertical line or slightly curved line connected to a contiguous top portion which formes a closed loop.

The OCR software is instructed to stop after the first attempt at recognition is made. If the match percentage output is greater than a predetermined threshold percentage, then a "match" is assumed and the subroutine proceeds to the next step. If the match percentage output is less than the predetermined threshold, then the check is aborted at step 212 and either rescanned to obtain a better image or manually inspected, as desired. The confidence level of the verification subroutine 120 can be adjusted, as desired, by increasing or decreasing the threshold match percentage required to assume a match has been made. A threshold match percentage of between about 75% and 100% and, more preferably, about 90% provides a convenient confidence level for most expenditure tracking purposes.

It will be appreciated that by using secondary OCR recognition the amount written in the amount box 18 can be quickly and accurately verified against the MICR code dollar amount with recognition rates exceeding roughly 90%. This is a significant improvement over most primary OCR techniques, which currently achieve only about a 66% recognition rate for hand-written numerical characters. Alternatively, as OCR technology develops and improves it is further envisioned that OCR may be used directly to read and verify the written check amount against the MICR code.

The next step 214 asks whether there are more digits to be compared. This step basically uses the OCR software to verify whether the isolated digit corresponds to a printed dollar sign, which is also preferably captured in the amount box 18'. When the software recognizes the printed dollar sign, it assumes that it has reached the end of the left most field of the amount image 18'. Because this dollar sign is printed uniformly on each check, it is easily recognizable using the OCR software described above. Alternatively, a simple pixel image overlay technique may be used, as desired. If step 214 determines that there are more digits to be compared, then step 216 increments the digit counter N and returns the subroutine to the step 206 for isolating the next digit. The subroutine 120 continues to operate as described above until all digits have either been verified or the check has been aborted. Once all the digits have been verified, then step 216 outputs the verified MICR dollar amount for use in subsequent processing steps. The subroutine 120 terminates at step 218 and command control is passed back to the central processor 108.

Figure 12:
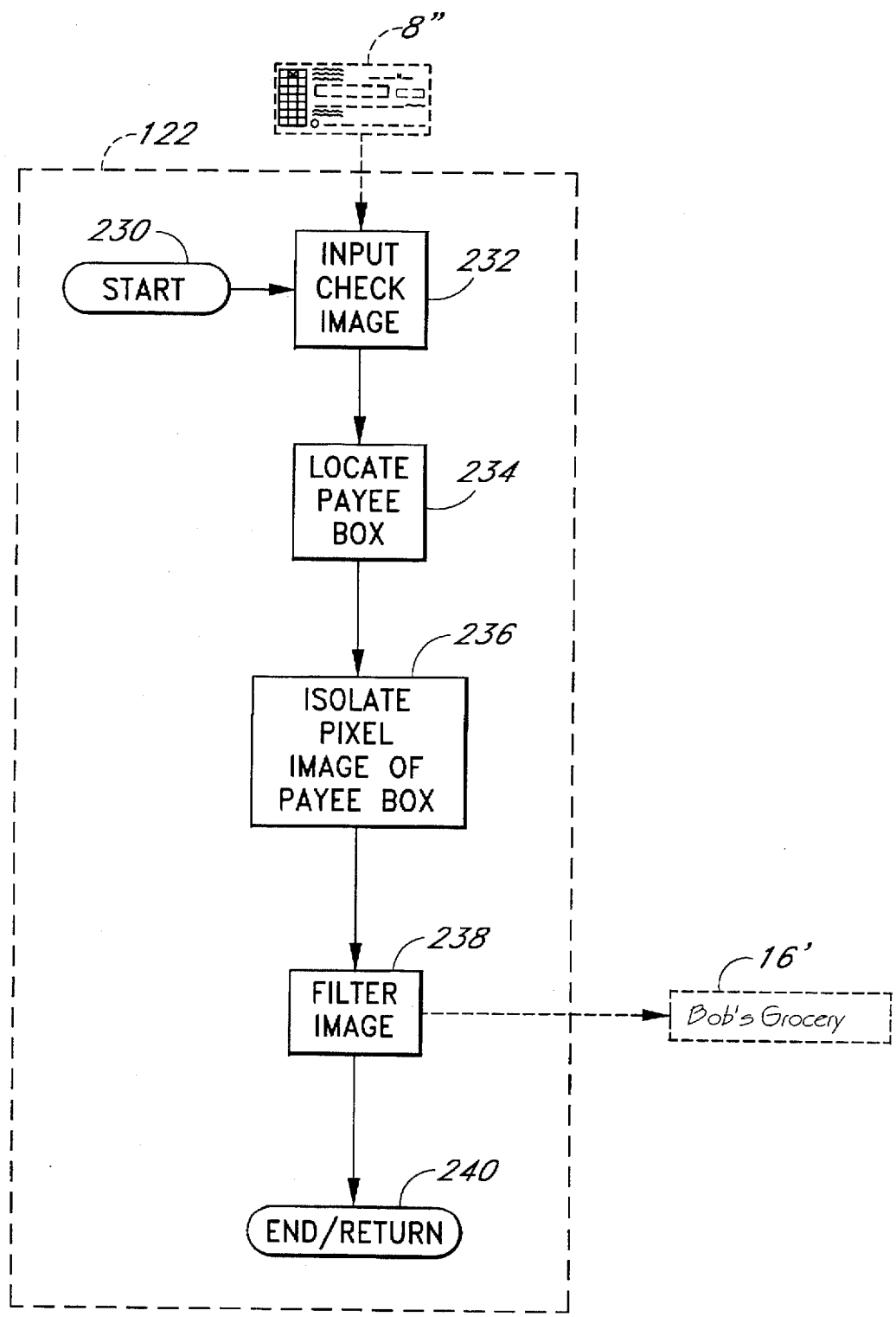
FIG. 12 is a more detailed schematic diagram of the payee box capture sub-routine 122 of FIG. 8.

FIG. 12 is a more detailed flowchart diagram of the subroutine 122 shown in FIG. 8. This capture subroutine 122 is similar to the capture subroutine 118 described previously with a few exceptions that will be described. The subroutine is initialized at step 230. Step 232 inputs the corrected check image 8" into working memory. Again, this is preferably done by enabling access to a commonly accessible memory area, as described previously. Step 234 locates the payee box 16 using the edge detection technique described previously in connection with FIG. 10. A zone is defined corresponding to the expected location of the payee box 16 and an isolated pixel image is obtained thereof in step 236. This image is then cropped and rotated as desired so that it will present neatly in an expenditure statement, as shown previously in FIG. 7. This image is then filtered at step 238, if desired, using the aforementioned speckle removal filtering technique. The filtered image of the payee box 16' is then outputted, as shown, for further use by the central processor 108. The subroutine 122 terminates at step 240 and command control is passed back to the central processor 108.

Figure 13:
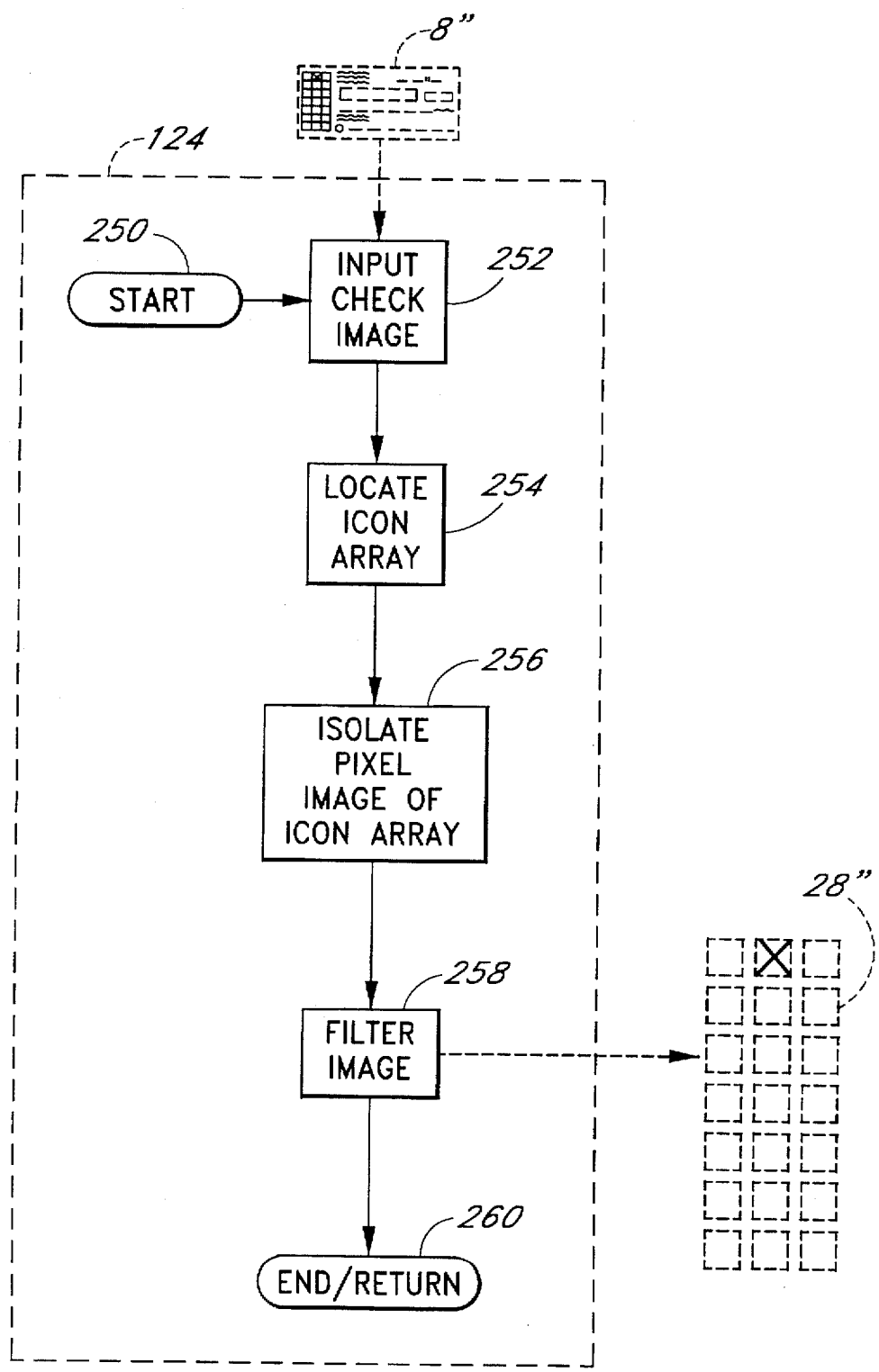
FIG. 13 is a more detailed schematic diagram of the icon array capture sub-routine 124 of FIG. 8.

FIG. 13 is a more detailed flowchart diagram of the subroutine 124 shown in FIG. 8. This subroutine captures an image of the icon array 28' including any supplemental or auxiliary icon boxes (not shown). The subroutine is initialized at step 250. The corrected check image 8" is inputted at step 252, preferably by enabling access to a commonly accessible memory area containing binary data representative of the check image 8". Step 254 locates the icon array 28'. This may be done using any one of a variety of pixel image detection techniques, as previously described.

Preferably, a combination of zone locating and edge detection techniques are used to locate the icon array 28'. A suitable zone is defined such that it covers substantially the entire area within which the icon array 28' is expected to be found. A zone measuring approximately 660 pixels vertically by approximately 330 pixels horizontally provides a convenient zone size for capturing the icon array 28'. Within the zone, edge detection is used to locate the edge of white pixels just outside of the outer frame of individual icons in order to register the image for subsequent processing. Optionally, the image 28' may be filtered in step 258 using a speckle filtering technique, as described previously. The filtered image 28" is then outputted for further processing by the central processor 108. The subroutine terminates at step 260 and command control is passed back to the central processor 108.

Figure 14:
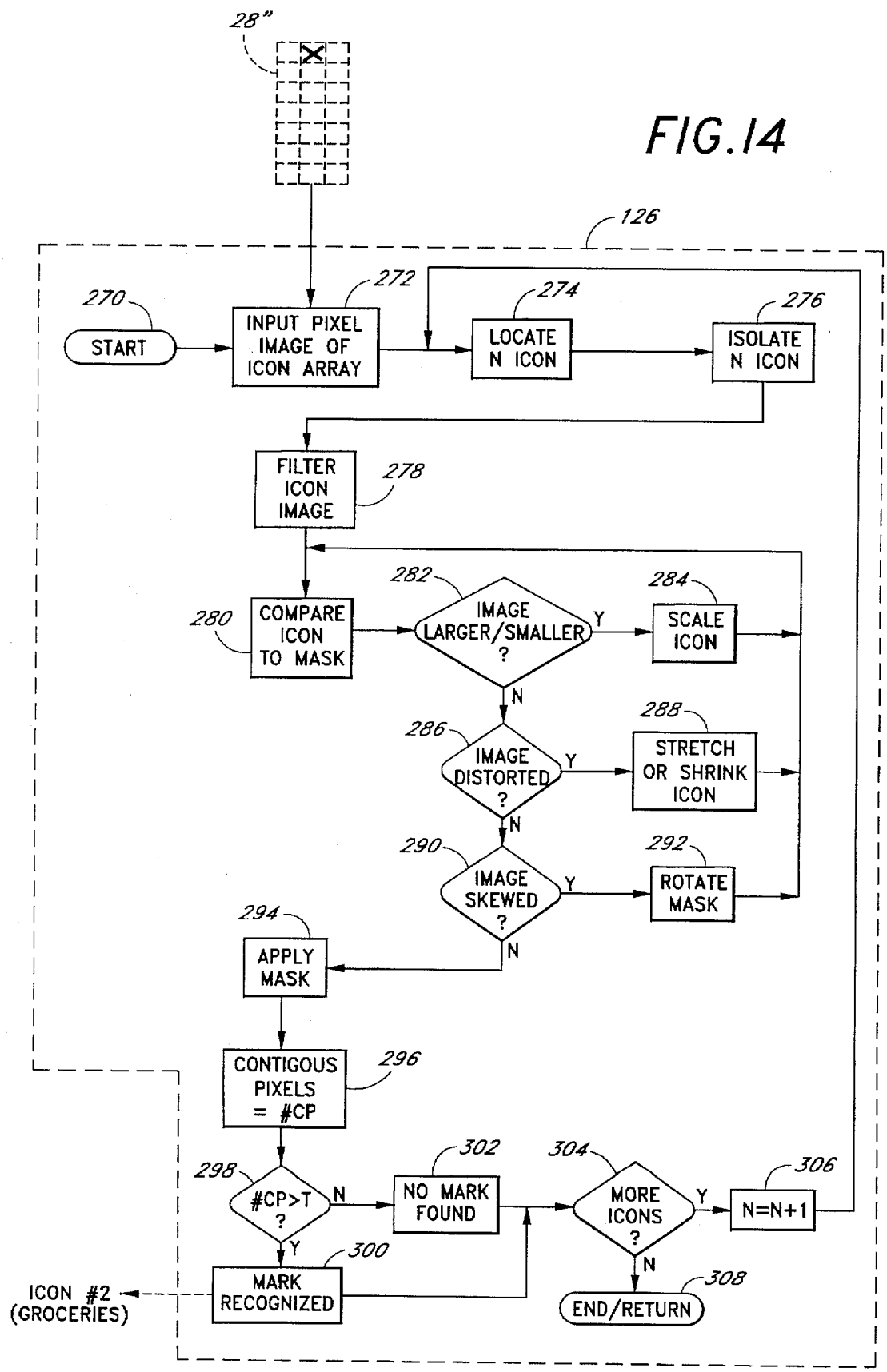
FIG. 14 is a more detailed schematic diagram of the mark detection sub-routine 126 of FIG. 8.

FIG. 14 is a more detailed flowchart diagram of the subroutine 126 shown in FIG. 8. This subroutine determines which, if any, icons have been marked by a bank customer. The subroutine 126 is initialized at step 270. The filtered image of the icon array 28" is inputted at step 272, preferably by enabling access to a commonly accessible memory area containing binary data in the form of a TIFF file representative of the image 28". Step 274 locates each individual icon "N" by zone location using the white edge just outside of the black outer frame of individual icons as reference lines. Step 276 isolates each icon "N" by first copying the pixel image within the corresponding zone into a separate TIFF file stored in working memory and then applying edge detection to locate the white edges just inside the black outer frame of the copied icon image. Optionally, step 278 further filters each individual icon image to remove any remaining spurious noise or other image defects present in the icon image.

Figure 5C:
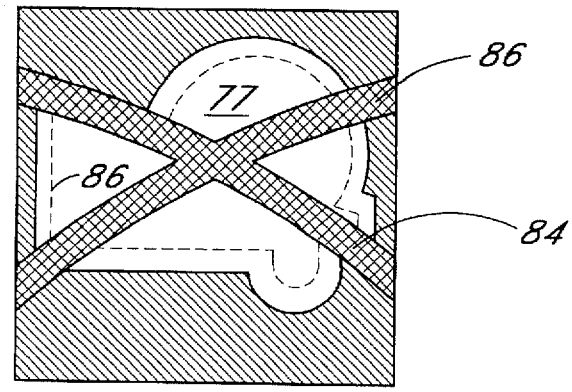

Individual icons are then masked in order to remove known dark portions of the icon image, as described previously in connection with FIG. 5C. A suitable mask such as mask 86 shown in FIG. 5C, is preferably created for each particular icon and is stored in working memory in the form of a bi-level pixel image or TIFF file that can be accessed and manipulated similar to the pixel icon images described above. Alternatively, the mask may reside in working memory in the form of a predetermined algorithm for removing or transforming known dark portions of each corresponding icon.

In order to apply the mask accurately, several steps are first performed to adjust the icon image and/or mask to provide a desired correspondence therebetween. It is particularly important to ensure that the icon and mask images are properly aligned so that known dark areas of the icon image will not protrude through open or white areas of the corresponding mask. To ensure consistent and adequate mask coverage, the open or white area of the mask 86 (corresponding to the area inside the dashed lines in FIG. 5C) is preferably somewhat smaller than the intended marking area 77, as indicated, in order to provide a degree of tolerance for slight misalignments. It will be further understood that the mask area outside of the dashed lines shown in FIG. 5C is preferably all black. Alternatively, a uniform mask may be applied over icons such as shown in FIG. 22 in order to eliminate any pixels attributable to the frame 479 and to detect the occurrence of supra-threshold pixels in the intended marking area within the frame 479.

Referring again to FIG. 14, step 282 determines whether the icon image is larger or smaller than the corresponding mask. This is preferably determined by edge detection and then counting the number of pixels within the detected outer edge of the icon. If the icon area is smaller than the corresponding mask, then the icon is scaled accordingly in step 284, using known pixel image scaling techniques such as contained Visionshape's in AutoClass® software library.

Step 286 checks to see whether the icon is distorted in any way. This is determined using edge detection and then counting the pixels along each edge of the icon to determine whether it is longer or shorter than expected. If distortion is detected, then step 288 stretches or shrinks the icon image, as needed, to provide a suitable correspondence with the mask. A variety of pixel image stretching or shrinking techniques may be used, as desired, to scale the image. A convenient technique, however, is to provide for pixel expansion or contraction from a center line dividing the icon horizontally or vertically, as needed. The two halves of the icon are then either separated or pushed together while columns or rows of icons are replicated or removed at the centerline in order to provide a contiguous pixel image. It will be appreciated that while the above described technique will not produce exactly scaled icons, it is fast and convenient where only small degrees of shrinkage or stretching are required and sufficient tolerance is otherwise provided in the mask to accommodate slight icon variations.

The next step 290 checks for possible skew of the icon image. If skew is detected, step 292 rotates the mask image accordingly in predetermined increments until the skew is corrected to within predetermined tolerances. Again, this may be done using any variety of well known image pixel rotation techniques such as contained in Visionshape's Auto-Class® software library. Alternatively, the pixel icon image may be rotated, if desired, to correct for skew.

Once the pixel image of the icon and mask have been adjusted to correspond, then the mask is registered with the icon and applied at step 294. This is done by combining or merging the registered mask image with the icon image using an appropriate combination of Boolean operators, such as AND, NAND or XOR. A NAND operator is particularly preferred for achieving the desired masking result, as illustrated in TABLE 4 below.

TABLE 4

| IMAGE (i) | B | B | W | W |
|---|---|---|---|---|
| MASK (m) | B | W | B | W |
| RESULT (r) | W | B | W | W |

It will be understood by those skilled in the art that a logical NAND operator, i.e., (i NAND m), takes the value FALSE or "0" if both i and m are "1" (corresponding to both black pixels), or TRUE or "1" if either i and m are "0" (corresponding to both white pixels, or mixed white and black pixels). If (i NAND m) is FALSE, then the corresponding RESULT pixel, r, is set equal to NOT(/) or "W" as indicated above in TABLE 4. If (i NAND m) is TRUE, then the corresponding RESULT pixel, r, is set equal to i. The resulting pixel image should be composed of substantially all white pixels except for any marks placed on the icon by a bank customer.

Step 296 counts the number of remaining contiguous black pixels (#CP) present in the resulting icon image. Step 298 compares this number (#CP) to a threshold number of pixels (T) required to assume that a mark has been detected. If the number of remaining contiguous black pixels (#CP) is greater than this threshold number (T), then a mark is assumed to be detected. Step 300 outputs the icon number (N) corresponding to the selected expenditure category, in this case groceries, and the subroutine 126 continues on to the next step. On the other hand, if the number of contiguous black pixels (#CP) is less than the threshold number (T), then step 302 acknowledges that no mark has been detected for that particular icon (N). A threshold (T) of about two-hundred pixels provides a convenient reference number for assuming the existence of a mark. Alternatively, smaller or larger threshold numbers (T) may be used, as desired, while still enjoying the benefits of the present invention.

Step 304 determines whether there are more icons to be examined. If so, step 306 increments the icon counter (N)

and the subroutine returns to step 274 in order to examine the next icon (N). If no more icons are left to be examined, then the subroutine terminates at step 308 and returns command control to the central processor 108. Note, that the subroutine 126 may output more than one expenditure category if, for instance, the bank customer has marked more than one icon, indicating that the check transaction is to be split evenly between the marked categories.

Figure 24:
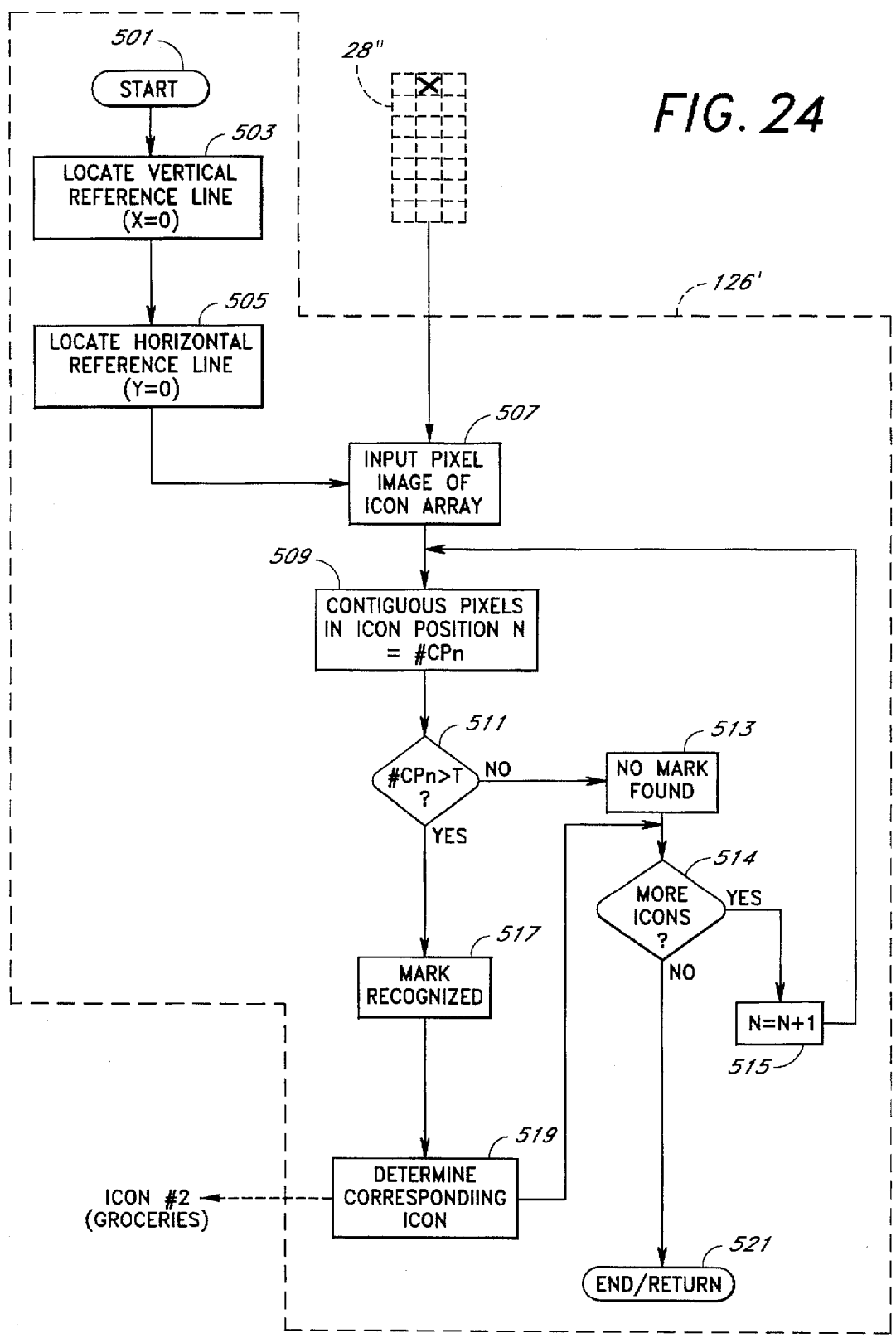
FIG. 24 is a detailed schematic diagram of an alternative mark detection sub-routine 126' which may be substituted for the subroutine 126 of FIG. 8.

FIG. 24 shows an alternative subroutine 126' for detecting which of a plurality of icons in an array of icons has been marked. Preferably, the subroutine 126' may be used with checks having an array of drop-out icons printed in accordance with the preferred embodiment shown and described in connection with FIG. 23. It will be recalled that in this particular embodiment, the entire icon 464' is printed or screened using a drop-out ink so that the entire icon will be invisible to a scanner, as shown in FIG. 23B. Any marks made on the icon will appear as dark pixels in an otherwise white image. The subroutine 126' locates these pixels on an x-y grid relative to one or more predetermined reference lines and icon positions to determine whether a corresponding icon has been marked.

The subroutine 126' begins at step 501 with the routine initialization of variables, defining common variables, allocation of working memory, etc. At step 503 the subroutine locates a predetermined vertical reference line corresponding to the line x=0 on an x-y grid. This may be accomplished using any one of a number of line or edge detection techniques well known in the art. Next, at step 505 the subroutine locates a predetermined horizontal reference line corresponding to the line y=0 on the x-y grid. Again, this may be accomplished using a line or edge detection technique.

The reference lines are preferably black horizontal and vertical lines disposed on the check in or near the icon array 28. These lines are preferably printed in a non-drop-out color such as black so that they may be detected by a scanner. If desired, the payee box, amount box, memo line, or signature line of a check may be used as convenient reference lines for locating the icon array on an x-y grid. In a particularly preferred embodiment shown in FIGS. 20 and 21, the memo line 324 includes a short vertical reference line 325 originating at the far left side of the memo line and extending approximately 0.25 inches upward. The combination of the horizontal memo line 324 and the vertical reference line 325 provide a convenient reference for locating the icon array 28 with respect to the x-y grid shown.

Preferably, the reference lines are at least 0.7 points (0.0097 inches) thick and are printed using a non-drop-out ink, as indicated above. Any color having a minimum PCS of about 0.4 would be acceptable as a non-drop-out color. This would include black, dark blue, dark forest green, etc. Black is the most preferred color because it is the darkest and is standard within the check printing industry.

Referring again to FIG. 24, once the subroutine 126' identifies and locates the reference lines in steps 503, 505, the relative x-y position of the icon array and corresponding icon positions can be calculated in accordance with predetermined preferred dimensions. The subroutine 126' then inputs the portion of the check image corresponding to the icon array 28' at step 507 and stores this in working memory. At step 509 the subroutine counts the number of contiguous supra-threshold ("black") pixels (#$CP_n$) present in the resulting pixel image in a location corresponding to a particular icon position "n". If the number of contiguous black pixels (#$CP_n$) is less than a predetermined threshold number (T), then the subroutine assumes that no mark is present in that particular icon area, as indicated at step 513. A threshold (T) of about two hundred contiguous pixels provides a convenient reference number for determining the existence of a mark. If no mark is detected, then the subroutine increments the icon position counter "n" at step 515 and the subroutine returns to step 509.

On the other hand, if the number of contiguous black pixels (#$CP_n$) in a particular icon position "n" is greater than the threshold number (T) then the subroutine 126' assumes that a mark is present, as indicated by step 517. The subroutine then outputs the corresponding selected expenditure category at step 519, in this case groceries, and the subroutine continues on to the next step. This process continues until all icon positions "n" have been checked as indicated at step 514. Once all icon positions "n" have been checked for marks, the subroutine 126' terminates at step 515 and returns command control to the central processor 108.

Figure 15:
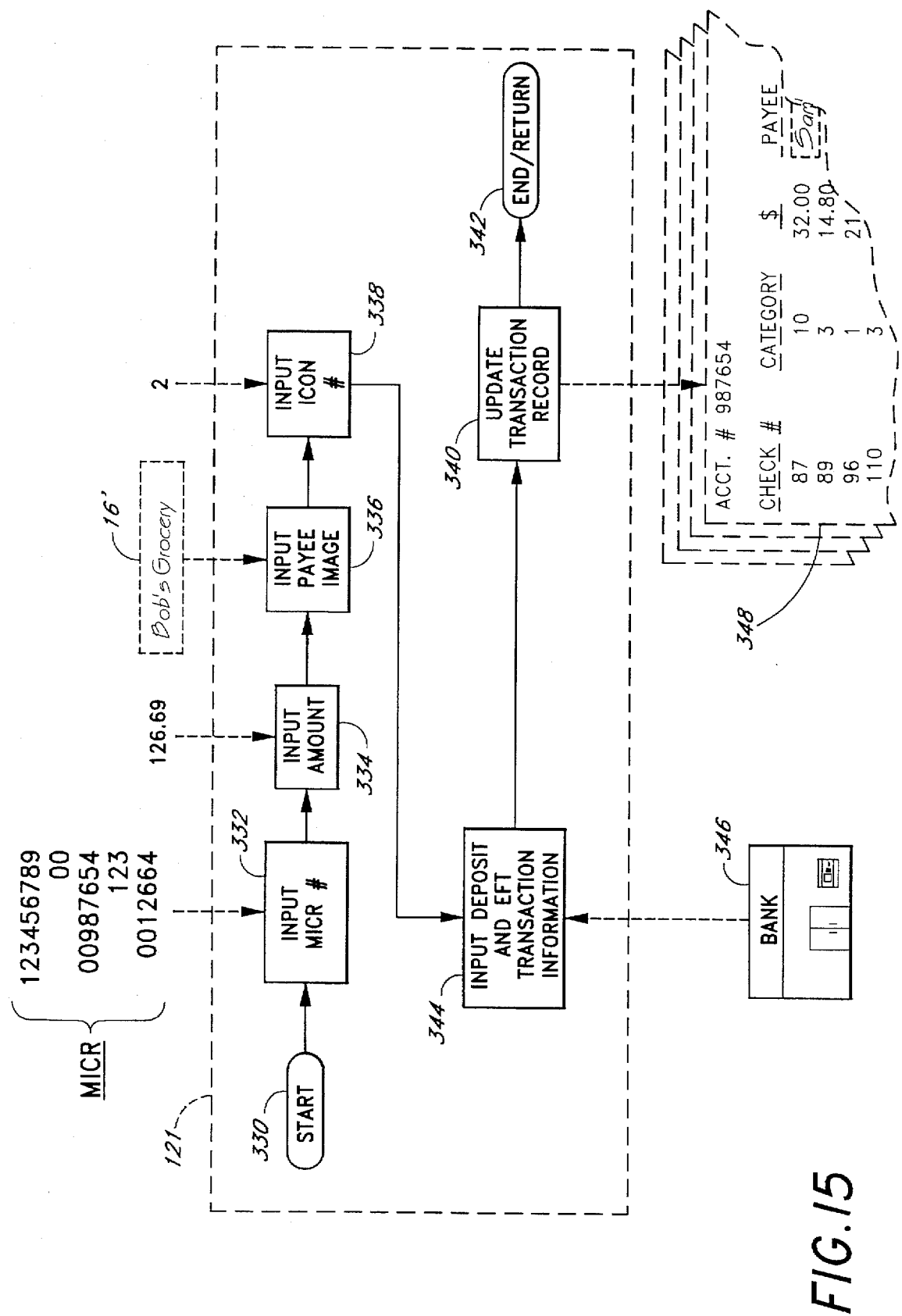
FIG. 15 is a more detailed schematic diagram of the transaction update sub-routine 121 of FIG. 8.

FIG. 15 is a more detailed flowchart diagram of the subroutine 121 shown in FIG. 8. This subroutine updates a stored transaction record according to information received from other subroutines described above. The subroutine is initialized at step 330, as indicated. Step 332 inputs the MICR code obtained from the MICR decoder 104 shown in FIG. 8. Step 334 inputs the verified amount of the check which is the output of the subroutine 120 indicated in FIG. 8 and described in more detail in FIG. 11. In this case, the indicated amount is $126.69. Step 336 inputs the pixel image of the payee box 16' previously outputted by the subroutine 122 shown in FIG. 8 and described in more detail in FIG. 12. Step 338 inputs the icon number (or numbers) for which marks have been detected by the mark detection subroutine 126 shown in FIG. 8 and described in more detail in FIG. 14. Optionally, step 344 inputs deposit, ATM, POS and other EFT transaction information from a bank 346 or EFT network. This latter information may be internal to the bank or, alternatively, it may be downloaded via modem to a separate processing center, as desired.

Step 340 records inputted information in a cumulative transaction record according to account number, check transaction number, expenditure category, dollar amount and payee. Preferably this transaction record is stored in a computer data base or other storage media, as desired, such that it may be periodically accessed, further processed and incorporated into an expenditure statement 348, as shown. For maximum convenience, this statement 348 is preferably in the form of a more detailed bank account statement showing expenditures, deposits, balance, interest earned, ATM, POS and EFT transactions, etc. Alternatively, other types of reports or statements may be produced, as desired, to provide transaction information to a bank customer in a convenient form. After each transaction is recorded, the subroutine 121 terminates and passes command control back to the central processor 108.

In a particularly preferred embodiment, an expenditure tracking system and method in accordance with the present invention is further adapted to automatically track electronic transactions such as may occur through the use of an ATM or POS terminal. Preferably, bank customers are provided with an ATM card, credit card, or other wallet-sized card that is printed with a plurality of graphic icons corresponding to predetermined expenditure categories, substantially as described above. Superimposed over each icon is a Transaction Icon Number (TIN) which identifies each possible icon choice.

At an ATM or POS terminal, the customer enters the usual Personal Identification Number (PIN) to obtain access to his funds electronically. The customer then further enters a TIN number corresponding to the particular ATM or POS transaction expenditure category applicable. This information may either be prompted for by the ATM or POS terminal or, alternatively, the TIN may simply be entered immediately following the initial PIN access code separated, for instance, by either the "*" or "#" key. Alternatively, icons may be displayed directly on an ATM or POS screen and may be selected by a bank customer by touching the screen or by depressing a corresponding button provided on the ATM or POS keypad, as desired.

Optionally, it is further envisioned that a "smart-card" type credit or ATM card may also be provided such as, for instance, a Schlumberger-type IC card. Such a card could comprise, for instance, a simple microprocessor, IC terminals, and magnetic strip and/or internal storage capabilities, as desired. A plurality of printed icons may be provided on the card, itself, disposed on a corresponding grid of pressure sensitive buttons. Icons may then be selected by depressing the pressure sensitive button corresponding to each icon. Prior to inserting the smart-card, for instance, the card user presses the icon which best classifies the nature of the particular electronic transaction. This information is then transmitted via the IC terminals to the ATM or POS or other EFT terminal, as desired, for providing automated tracking of electronic expenditure transactions.

As noted above, preferably deposit and EFT transaction information is inputted electronically from the payor bank or EFT network to the expenditure tracking system, which is also preferably located within the payor bank. Alternatively, at least some portion of the expenditure tracking system may be located in an off-site processing center, such as in a check clearing house or other check processing center, as desired. For instance, in one alternatively preferred embodiment of the present invention checks are MICR read and scanned for marks in a check clearing house. For each check the clearing house detects which expenditure categories have been selected and records this information on a magnetic tape of check transactions of the type that is ordinarily provided to each payor bank serviced by the check clearing house. The payor bank then downloads this information into its own computer, as desired, and organizes it to produce an expenditure statement or more detailed bank statement in accordance with the present invention.

In another alternative preferred embodiment, an individual bank customer may request that his canceled checks be returned to a designated check processing center. The processing center MICR reads and scans each canceled check to generate a statement of expenditures broken out by account, expenditure category and amount, which is sent back to the bank customer. Advantageously, this enables a customer at virtually any bank to enjoy the benefits of the present invention as herein disclosed. Optionally, the bank customer may further designate that his bank statement be forwarded to the processing center so that the information therein can be combined with the expenditure information obtained from the canceled checks in order to generate a more detailed bank statement of the type described above.

In that event, the bank statement is used as a foundational document for generating the customer's more detailed statement. Advantageously, by relying on the bank statement and not the customer's own journal of transactions, the present invention offers a consistent and comprehensive journalization of transactions without requiring secondary data entry or electronic downloading of information from each individual banking institution handling those particular transactions. Also, this ensures that customers who fail to consistently mark their checks will still receive valuable financial records which capture ATM, POS and other recorded transactions. Advantageously, the tracking system in accordance with the present invention continues to provide detailed information on ATM and EFT transactions, as well as showing the amount of unclassified or miscellaneous funds expended, thereby subtly reminding the client to stay current with expenditure marking.

Preferably, a customer's bank statement is recognized by using a variable vertical zone delimiting technology available from high-end OCR developers, such as Visionshape® of Orange, CA. A unique OCR template is created for each type of bank statement that may be encountered. The software is then "trained" to identify items such as horizontal lines and field description titles in order to extract the desired information.

To process a particular customer's bank statement, the statement is first scanned into a computerized image processing system. The software first registers the column location for each particular field of information contained on the statement. Variable zones are then defined extending down from each corresponding field. The zones are variable in the sense that the software will continue to expect data to occur in the same horizontal field location until it confronts a different graphic configuration, such as a horizontal line in a zone defining text. The software will then expect that the zone is changing where a new type of data will be processed. This new zone will be identifiable, not only by the horizontal line and text, but an OCR reader will also encounter new headings and column configurations which also signifies the occurrence of a new or different type of data. The text within each zone is then OCR read and recorded. Key words in the POS and ATM description fields are similarly identified and recorded such that the transactions may be properly categorized and identified in a subsequently generated expenditure report. Other possible preferred embodiments will be readily apparent to those skilled in the art.

Although this invention has been disclosed in the context of certain preferred embodiments, it will be understood by those skilled in the art that the present invention extends beyond the specifically disclosed embodiments to other alternative embodiments of the invention. Thus, it is intended that the scope of the present invention herein disclosed should not be limited by the particular disclosed embodiments described above, but should be determined only by reference to the claims that follow.

What is claimed is:

1. A method of categorizing and/or tracking expenditure transactions comprising the following steps:

providing a check substrate having a predetermined number of pictographic icons thereon arranged in a two-dimensional array each said icon being representative of a particular expenditure category and being adapted to receive a mark directly thereon; and detecting the presence of a mark placed directly on one or more of said pictographic icons by:
scanning said substrate to obtain a series of data representative of a bi-level pixel image of said icon array relative to a predetermined PCS level generally above the PCS level of said pictographic icons but generally below the PCS level of a mark placed on one or more of said pictographic icons such that said icons are not detected or are caused to drop out of the resulting pixel image;
locating in said pixel image one or more predetermined reference lines;

detecting in said pixel image the existence of data representative of a mark placed in said icon array relative to said reference lines corresponding to a particular icon position; and determining the pictographic icon: icon number and/or expenditure category corresponding to said icon position.

2. The method in accordance with claim 1 wherein said substrate is scanned using a bi-level scanner having a predetermined threshold PCS detection level of about 0.4.

3. The method in accordance with claim 2 wherein said pictographic icons have a PCS of less than about 0.4.

4. The method in accordance with claim 1 wherein said icons are printed on a bank check such that they may be directly marked upon by a bank customer to indicate the selection of one or more of a plurality of predetermined expenditure categories.

5. A printed icon for tracking check expenditures, said icon comprising an outer portion generally surrounding a lighter inner portion, said outer portion comprising no more than about 25% of the total surface area of said icon, said light inner portion comprising no more than about 25% shading, the remaining portion thereof being substantially free of any printing.

6. The method in accordance with claim 1 wherein each said pictographic icon is contained within an outer frame defining an intended marking area.

7. The method in accordance with claim 4 comprising the further step of recording each said selected expenditure category in association with other information representative of each said corresponding expenditure transaction and periodically organizing said information representative of each said expenditure transaction and each said associated selected expenditure category into a statement of expenditures broken down by expenditure category.

8. The method in accordance with claim 7 further comprising the step of recording information representative of deposit transactions and periodically organizing said information representative of deposit transactions, said information representative of each said expenditure transaction and each said selected expenditure category into a detailed statement of expenditures, deposits and account balance.

9. The method in accordance with claim 1 wherein said substrate is scanned using a bi-level scanner to produce a series of binary data representative of said bi-level image relative to said predetermined PCS level.

10. The method in accordance with claim 1 wherein said substrate is scanned using a grey-scale scanner to produce a series of data representative of a grey-scale image of said icon array which is converted to said bi-level image by applying filtering or thresholding relative to said predetermined PCS level.

11. The method in accordance with claim 1 wherein reference lines comprise target markings on or adjacent to said icon array.

12. The method in accordance with claim 1 wherein said reference lines comprise one or more printed boxes formed around said icon array or each said icon in said icon array.

13. An expenditure tracking system using the method as recited in claim 1 in conjunction with printed checks and wherein said array of pictographic icons are representative of expenditure categories and which users can mark to indicate a particular expenditure category representative of each expenditure transaction.

14. The method in accordance with claim 1 wherein said pictographic icons have a PCS of less than about 0.4.

15. The method in accordance with claim 1 wherein said pictographic icons have a PCS of between about 0.15 and about 0.25.

16. A method of categorizing and/or tracking expenditure transactions comprising the following steps:

providing a check substrate having a predetermined number of pictographic icons thereon arranged in an array each said icon being representative of a particular expenditure category and being further adapted to receive a mark directly thereon; and detecting the presence of a mark placed directly on at least one of said pictographic icons by:

scanning said substrate to obtain a series of data representative of an image of at least a portion of said substrate containing said pictographic icon;

establishing within said image a boundary defining an area within which a mark is to be detected, said boundary generally surrounding the area of said substrate containing said pictographic icon; and detecting within the portion of said image defined by said boundary the existence of data representative of a mark on said substrate by detecting portions of said image having a PCS above a predetermined PCS level which is higher than the PCS level of said pictographic icon on said substrate.

17. The method in accordance with claim 16 wherein said pictographic icon has a PCS of less than about 0.4.

18. The method in accordance with claim 16 wherein said pictographic icon has a PCS of between about 0.15 and about 0.25.

19. The method in accordance with claim 16 wherein said predetermined threshold level comprises a PCS above about 0.4.

20. The method in accordance with claim 16 wherein said boundary comprises a frame printed on said substrate around said pictographic icon.

21. The method in accordance with claim 16 wherein said boundary comprises the general periphery of said pictographic icon within which a mark is to be detected.

22. The method in accordance with claim 16 wherein said substrate is scanned using a bi-level scanner to produce a series of binary data representative of said image relative to said predetermined PCS level.

23. The method in accordance with claim 16 wherein said substrate is scanned using a grey-scale or color scanner to produce a series of data representative of said image which is converted to a bi-level image by applying filtering or thresholding relative to said predetermined PCS level.

24. An expenditure tracking system using the method as recited in claim 16 in conjunction with printed checks upon which pictographic icons are printed representative of expenditure categories and which users can mark to indicate a particular expenditure category representative of each expenditure transaction.

25. The method in accordance with claim 16 wherein multiple pictographic icons are arranged on a substrate and wherein said method comprises the further step of locating one or more reference lines on said substrate and determining the location of a detected mark relative to said reference lines to determine which icons have been marked.

26. A method for categorizing a financial transaction comprising the following steps:

providing a check substrate having an array of pictographic icons thereon representative of expenditure categories, said icons having a PCS of less than about 0.40 measured over a spectral range having a peak spectral response of about 555 nanometers and a one-half peak spectral response of about 510 to 610 nanometers;

recording on said substrate information representative of said financial transaction, including the payor's name or identification, the amount of the financial transaction, and the name or identification of the payee to whom the amount is to be or has been paid; and placing a mark directly over at least one of said pictographic icons to indicate the appropriate expenditure category representing said financial transaction, said mark having a PCS of greater than about 0.40 measured over a spectral range having a peak spectral response of about 555 nanometers and a one-half peak spectral response of about 510 to 610 nanometers;

whereby the presence and/or location of said mark can be detected using a scanner and applying threshold imaging.

27. The method in accordance with claim 26 wherein said pictographic icons have a PCS of between about 0.05 and about 0.25 measured over a spectral range having a peak spectral response of about 555 nanometers and a one-half peak spectral response of about to 610 nanometers.

28. The method in accordance with claim 26 wherein said pictographic icons have a PCS of between about 0.15 and about 0.25 measured over a spectral range having a peak spectral response of about 555 nanometers and a one-half peak spectral response of about to 610 nanometers.

29. The method in accordance with claim 26 wherein said pictographic icons have a color and PCS generally corresponding to Purple Pantone #251.

30. The method in accordance with claim 26 wherein each said pictographic icon has an outer boundary or frame defining an intended marking area within said icon in which said mark is placed.

31. The method in accordance with claim 30 wherein said outer boundary or frame has a PCS of less than about 0.40 measured over a spectral range having a peak spectral response of about 555 nanometers and a one-half peak spectral response of about 510 to 610 nanometers.

32. The method in accordance with claim 30 wherein said outer boundary or frame has a PCS of greater than about 0.40 measured over a spectral range having a peak spectral response of about 555 nanometers and a one-half peak spectral response of about 510 to 610 nanometers.

33. The method in accordance with claim 26 comprising the further step of scanning said substrate to obtain a series of data representative of an image of at least a portion of said substrate containing said pictographic icon and detecting within said image the existence of data representative of a mark on said substrate by detecting portions of said image having a PCS greater than about 0.40.

34. The method in accordance with claim 33 wherein multiple pictographic icons are arranged on said substrate and wherein said method comprises the further step of locating one or more reference lines on said substrate and determining the location of a detected mark relative to said reference lines to determine which icon or expenditure category has been selected.

* * * * *

UNITED STATES PATENT AND TRADEMARK OFFICE
CERTIFICATE OF CORRECTION

PATENT NO. : 5,737,440
DATED : April 7, 1998
INVENTOR(S) : Kunkler

It is certified that error appears in the above-identified patent and that said Letters Patent is hereby corrected as shown below:

```
Column 37, line 5, replace "icon: icon" with --icon, icon--.
Column 39, line 18, replace "about to 610 nanometers" with --about 510 to
610 nanometers--.
Column 39, line 23, replace "about to 610 nanometers" with --about 510 to
610 nanometers--.
```

Signed and Sealed this

Fifteenth Day of September, 1998

Attest:

BRUCE LEHMAN

*Attesting Officer*     *Commissioner of Patents and Trademarks*